(12) United States Patent
Balasubramanian et al.

(10) Patent No.: US 11,935,109 B2
(45) Date of Patent: Mar. 19, 2024

(54) METHOD, COMPUTER PROGRAM PRODUCT, AND SYSTEM FOR TRAINING A MACHINE LEARNING MODEL TO GENERATE USER EMBEDDINGS AND RECIPE EMBEDDINGS IN A COMMON LATENT SPACE FOR RECOMMENDING ONE OR MORE RECIPES TO A USER

(71) Applicant: Maplebear Inc., San Francisco, CA (US)

(72) Inventors: Ramasubramanian Balasubramanian, San Francisco, CA (US); Girija Narlikar, Palo Alto, CA (US); Omar Alonso, Redwood City, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 17/709,998

(22) Filed: Mar. 31, 2022

(65) Prior Publication Data

US 2023/0316375 A1 Oct. 5, 2023

(51) Int. Cl.
*G06Q 30/0601* (2023.01)
*G06N 3/08* (2023.01)

(52) U.S. Cl.
CPC .......... *G06Q 30/0631* (2013.01); *G06N 3/08* (2013.01)

(58) Field of Classification Search
USPC ............................................... 705/26.1–27.2
See application file for complete search history.

(56) References Cited

U.S. PATENT DOCUMENTS

| 10,289,076 | B2 | 5/2019 | Kim et al. |
| 11,195,222 | B2 | 12/2021 | Archak et al. |
| 2019/0243922 | A1* | 8/2019 | Pinel ................. G06F 16/24522 |
| 2019/0295440 | A1 | 9/2019 | Hadad |

(Continued)

OTHER PUBLICATIONS

DietGuru.com now offers customized diet and meal plan for weight loss and improved health and energy. (Jan. 9, 2012). PR.Com (Press Releases) Retrieved from https://dialog.proquest.com/professional/docview/1474808142?accountid=131444 (Year: 2012).*

(Continued)

*Primary Examiner* — Jeffrey A. Smith
*Assistant Examiner* — Ashley D Preston
(74) *Attorney, Agent, or Firm* — Fenwick & West LLP

(57) ABSTRACT

An online concierge system generates recipe embeddings for recipes including multiple items and user embeddings for users, with the recipe embeddings and user embeddings in a common latent space. To generate the user embeddings and the recipe embeddings, a model includes separate layers for a user model outputting user embeddings and for a recipe model outputting recipe embeddings. When training the model, a weight matrix generates a predicted dietary preference type for a user embedding and for a recipe embedding and adjusts the user model or the recipe model based on differences between the predicted dietary preference type and a dietary preference type applied to the user embedding and to the recipe embedding. Additionally cross-modal layers generate a predicted user embedding from a recipe embedding and generate a predicted recipe embedding from a user embedding that are used to further refine the user model and the recipe model.

20 Claims, 6 Drawing Sheets

(56) References Cited

U.S. PATENT DOCUMENTS

| | | |
|---|---|---|
| 2021/0042708 A1 | 2/2021 | Gardiner et al. |
| 2021/0042800 A1* | 2/2021 | Chandra ................. H04L 51/02 |
| 2021/0104322 A1* | 4/2021 | Narayan ................ G06N 3/045 |
| 2021/0256367 A1* | 8/2021 | Mor ................... G06Q 30/0282 |
| 2021/0287271 A1 | 9/2021 | Prasad et al. |
| 2022/0188906 A1* | 6/2022 | Lacy .................. G06Q 30/0641 |

OTHER PUBLICATIONS

PCT International Search Report and Written Opinion, PCT Application No. PCT/US22/53235, dated Apr. 7, 2023, 8 pages.

\* cited by examiner

METHOD, COMPUTER PROGRAM PRODUCT, AND SYSTEM FOR TRAINING A MACHINE LEARNING MODEL TO GENERATE USER EMBEDDINGS AND RECIPE EMBEDDINGS IN A COMMON LATENT SPACE FOR RECOMMENDING ONE OR MORE RECIPES TO A USER

BACKGROUND

This disclosure relates generally to an online concierge system recommending items to a user and more specifically to selecting one or more recipes for display to a user of an online concierge system.

In current online concierge systems, shoppers (or "pickers") fulfill orders at a physical warehouse, such as a retailer, on behalf of customers as part of an online shopping concierge service. An online concierge system provides an interface to a customer identifying items offered by a physical warehouse and receives selections of one or more items for an order from the customer. In current online concierge systems, the shoppers may be sent to various warehouses with instructions to fulfill orders for items, and the shoppers then find the items included in the customer order in a warehouse.

To simplify selection of items for inclusion in an order, an online concierge system may maintain various recipes, with each recipe including one or more items. A user of the online concierge system may review a recipe and add items from the recipe to an order through the online concierge system, simplifying selection of items for inclusion in an order. A conventional online concierge system allows a user to browse recipes obtained by the online concierge system. While an online concierge system may organize recipes into different sections to simplify user browsing or selection of recipes, as the number of recipes in different sections increases, the amount of time for a user to select a particular recipe or to identify a particular recipe of interest increases. This increased time for browsing may discourage a user from subsequent interaction with the online concierge system. The increased number of recipes also may decrease performance of the online concierge system as a result of the increased computer processing resources and network bandwidth required to support such functionality.

SUMMARY

In one or more embodiments, an online concierge system obtains recipes from one or more sources. Example sources include a warehouse or a third party system (e.g., a website) exchanging information with the online concierge system. Each recipe includes one or more items, or a plurality of items. A recipe may include a quantity corresponding to each item included in the recipe. Additionally, a recipe may include instructions for combining items included in the recipe. The online concierge system stores recipes from one or more sources in a recipe store in some embodiments.

To simplify user interaction, the online concierge system may display one or more recipes to a user, allowing the user to select items included in a displayed recipe in an order. Displaying one or more recipes to a user allows the online concierge system to display a greater range of items to the user, increasing a number of potential items for the user to include in an order. However, displaying recipes to a user that are less relevant to a user may decrease subsequent interactions by the user with the online concierge system. For example, displaying recipes including items that contradict a user's dietary preferences or dietary restrictions would increase amounts of time spent by users to navigate from the displayed recipes to identify items or recipes consistent with the user's dietary preferences or dietary restrictions. To increase a likelihood of the online concierge system selecting recipes for display to a user that are relevant to the user, the online concierge system trains a machine learning recommendation model that determines a measure of relevance of a recipe to a user. In various embodiments, the machine learning recommendation model includes a set of layers comprising a user model and a different set of layers comprising a recipe model, so the machine learning recommendation model has a two-tower architecture. The user model outputs user embeddings representing users, while the recipe model outputs recipe embeddings representing recipes. As further described below, the user embeddings and the recipe embeddings are in a common latent space to simplify comparison.

To train the machine learning recommendation model, the online concierge system obtains training data from prior interactions by users with items or with recipes. From the prior interactions, the online concierge system generates examples that each include a user and a recipe. A label is applied to each example that indicates whether the user performed a specific interaction with the recipe. For example, a label indicates whether a user included one or more items included in a recipe in an order. As another example, a label indicates whether a user selected the recipe via the online concierge system. In other embodiments, the online concierge system 102 uses performance of alternative specific interactions by a user with a recipe to determine a label to apply to a user and a recipe in an example. The label applied to an example has a specific value in response to the user of the example having performed the specific interaction with the recipe of the example and has an alternative value in response to the user of the example not having performed the specific interaction with the recipe of the example.

To represent a user of the online concierge system, an example includes a set of characteristics of the user. Example characteristics of the user include items included in orders previously received from the user, dietary preferences stored in association with the user, a geographic location of the user, and other information describing interactions performed by the user or descriptive information maintained for the user. In various embodiments, the example includes different combinations of characteristics of the user to represent the user.

To represent a recipe, an example includes a set of attributes of the recipe. Attributes of the recipe include item embeddings of items included in the recipe. An item embedding of an item may be generated by the online concierge system applying a trained item model to attributes of the item obtained by the online concierge system. Item embeddings for items may be obtained from other sources in various embodiments. As different recipes may include different numbers of items, in some embodiments the online concierge system applies a regularization model to the set of item embeddings corresponding to items included in the recipe. The regularization model receives item embeddings as input and outputs a fixed length embedding, allowing the online concierge system to aggregate item embeddings of multiple items included in a recipe to output a fixed-length combined item embedding for the recipe that represents the combination of items included in the recipe.

Additional attributes of a recipe include term embeddings obtained from names of the items included in the recipe. The online concierge system applies one or more methods, such as Word2Vec, GloVE, or bidirectional encoder representations from transformers, to text names of items included in a recipe to generate a term embedding for each item of an item included in the recipe. In other embodiments, the online concierge system may use other models, or combinations of models, to generate a term embedding from a textual name of an item included in the recipe. The online concierge system may also determine a document embedding for the recipe from instructions in the recipe, and the document embedding may be used for combining items included in the recipe. In various embodiments, the online concierge system applies a document embedding model, such as a long short-term memory (LSTM) model or Doc2Vec, to text in the recipe comprising instructions for combining ingredients included in the recipe to generate the document embedding for the recipe. In other embodiments, the online concierge system may apply other document embedding models to generate the document embedding for the recipe. If a recipe includes nutritional information, the online concierge system applies the document embedding model to the instructions in the recipe for combining items included in the recipe and the nutritional information included in the recipe to generate the document embedding for the recipe. Further, in embodiments where a recipe includes one or more images, one or more attributes of the recipe include image embeddings generated for each of the one or more images included in the recipe. For example, the online concierge system applies a convolutional neural network, such a residual neural network, to an image included in the recipe to output an image embedding for the image. Various convolutional networks may be used to generate an image embedding in different embodiments.

In some embodiments, an attribute of a recipe includes one or more salient items of the recipe. For example, the online concierge system determines if an item is a salient item of the recipe based on a quantity of the item specified by the recipe and quantities of the item specified by other recipes. In an example, the online concierge system identifies an item as a salient item of the recipe when a quantity of the item specified by the recipe is greater than a value for the quantity of the item specified in other recipes (e.g., a mean quantity of the item specified in other recipes, a median quantity of the item specified in other recipes, etc.). As another example, the online concierge system identifies an item as a salient item of the recipe in response to a quantity of the item specified by the recipe exceeding a serving size for the item, determined from information stored in association with the item. The online concierge system may normalize the quantity of the item included in the recipe, the value for the quantity of the item specified in other recipes, or the serving size of the item in some embodiments. In other embodiments, the online concierge system determines a weight of an item included in a recipe based on term frequency-inverse document frequency that accounts for a number of the obtained recipes that include the item; a salient item for the recipe may be an item with at least a threshold weight or an item having at least a threshold position in a ranking of items of the recipe based on their corresponding weights.

The online concierge system applies the machine learning recommendation model to each of a plurality of examples of the training data. When applying the machine learning recommendation model to an example, features of the user of the example are input to the layers of the machine learning recommendation model comprising the user model, while features of the recipe of the example are input to the layers of the machine learning recommendation model comprising the recipe model. The user model outputs a user embedding for the user of the example, while the recipe model outputs a recipe embedding for the recipe of the example. The machine learning recommendation model determines a measure of similarity between the user embedding from the user model and the recipe embedding from the recipe model and outputs the measure of similarity. For example, the machine learning recommendation model outputs a dot product or a cosine similarity between the user embedding and the recipe embedding. In other embodiments, the machine learning recommendation model minimizes a triplet loss. However, other measures of similarity between the user embedding and the recipe embedding may be output by the machine learning recommendation model in other embodiments.

To train the machine learning recommendation model, the online concierge system initializes a network of a plurality of layers that comprises the machine learning recommendation model and applies the machine learning model to the labeled examples of the training data. For an example of the training data, the online concierge system inputs characteristics of the user of the example to the layers comprising the user model and inputs attributes of the recipe of the example to the layers comprising the recipe model. From the user embedding output from the user model and the recipe embedding output from the recipe model, the machine learning recommendation model outputs a predicted measure of similarity between the user of the example and the recipe of the example.

The online concierge system generates one or more error terms from a difference between the predicted measure of similarity between the user of the example and the recipe of the example and the label applied to the example. An error term is generated from a loss function based on the difference between the predicted measure of similarity of the user of the example and the recipe of the example and the label applied to the example. The online concierge system backpropagates the one or more error terms from the difference between the label applied to the example of the training data and the output of the machine learning recommendation model through layers of the user model and of the recipe model. This backpropagation updates one or more parameters of the user model and of the recipe model. The online concierge system may iteratively update the machine learning recommendation model a specified number of times or until one or more criteria are satisfied.

Additionally, the machine learning relevance model includes one or more classification layers, such as a weight matrix, configured to receive a user embedding from the user model and to receive a recipe embedding from the recipe model. The classification layers output a predicted dietary preference type from the input user embedding and the input recipe embedding in some embodiments, while in other embodiments the classification layers output a vector of probabilities that each correspond to a different dietary preference. Example dietary preference types include vegetarian, vegan, gluten free, and other descriptions of characteristics of items. In various embodiments, the classification layers form a neural network.

When training the machine learning recommendation model, the online concierge system obtains classification examples that each include a classified user and a classified recipe. Classification labels are applied to each classification example specifying a dietary preference type corresponding to the classified user and specifying a dietary preference type corresponding to the classified recipe. The dietary preference of a recipe may be retrieved from a field included in the recipe or may be derived from items included in the recipe. Similarly, the dietary preference of a user may be stored in an account maintained for the user by the online concierge system, may be specified by an input received from the user, or may be derived from attributes of items the user has previously included in orders over time. In some embodiments, the classification examples are a subset of the examples of the training data further described above, while in other embodiments the classification examples are obtained from separate classification training data.

The online concierge system applies the machine learning recommendation model to a plurality of the labeled classification examples. For a classification example, the online concierge system inputs characteristics of the classified user of the classification example to the layers comprising the user model and inputs attributes of the classified recipe of the classification example to the layers comprising the recipe model. The user embedding output from the user model and the recipe embedding output from the recipe model are received by the weight matrix, which outputs a predicted dietary preference type for the user embedding and a predicted dietary preference type for the recipe embedding.

The online concierge system compares the predicted dietary preference type for the classified user to the label applied to the recipe in the classification example and compares the predicted dietary preference type for the classified recipe to the label applied to the recipe of the classification example. If the comparison indicates the predicted dietary preference type for the classified user differs from the label applied to the classified user in the classification example or indicates the predicted dietary preference type for the classified recipe differs from the label applied to the classified recipe in the classification example, the machine learning recommendation model updates one or more parameters of the machine learning model using one or more supervised learning methods. For example, the online concierge system backpropagates one or more classification error terms generated from a difference between the predicted dietary preference type for the classified user and the label applied to the classified user by the classification example or from a difference between the predicted dietary preference type for the classified recipe and the label applied to the classified recipe by the classification example. The one or more classification error terms are generated by a suitable loss function, or combination of loss functions, based on a difference between the predicted dietary preference type for the classified user or the predicted dietary preference type for the classified recipe and a corresponding label applied to the classified user or to the classified recipe, respectively, in the classification example; different implementations may use different loss functions to generate the one or more error terms. One or more parameters of the machine learning recommendation model are modified through any appropriate technique from the backpropagation of the one or more classification error terms through the layers comprising the user model and through the layers comprising the recipe model. Modifying parameters of the machine learning recommendation model based on differences between predicted dietary preference type for the classified user and the predicted dietary preference type for the classified recipe allows the recipe embeddings and the user embeddings generated by the machine learning recommendation model to be better aligned in the common latent space.

To further align generated user embeddings and recipe embeddings in the common latent space, a user embedding output by the user model of the machine learning recommendation model is also input into a cross-modal recipe set of layers. The cross-modal recipe set of layers receives the user embedding and generates a predicted recipe embedding representing a predicted recipe with which the user corresponding to the user embedding has at least a threshold likelihood of performing the specific interaction used to generate the examples of the training data. For examples of the training data including a user and a recipe and having a label indicating the user of the example performed the specific interaction with the recipe of the example, the user embedding output by the user model is input to the cross-modal recipe set of layers.

The online concierge system compares the predicted recipe embedding output by the cross-modal recipe set of layers to the recipe embedding output by the recipe model for the recipe of the example. A cross-modal loss function generates a cross-modal recipe error term from a difference between the predicted recipe embedding and the recipe embedding for the recipe of the example. The cross-modal recipe error term is backpropagated through layers of the machine learning recommendation model, such as the layers comprising the recipe model, to update one or more parameters of the machine learning recommendation model. Various loss functions, or combinations of loss functions, may be used to generate the cross-modal recipe error term from the difference between the predicted recipe embedding and the recipe embedding for the recipe of the example. The online concierge system may iteratively update the machine learning recommendation model a specified number of times or until one or more criteria are satisfied using any suitable supervised learning method. For example, the online concierge system iteratively updates the machine learning recommendation model until the cross-modal loss function based on the difference between the predicted recipe embedding and the recipe embedding for the recipe of the example satisfies one or more conditions. When the one or more cross-modal loss functions based on the difference between the predicted recipe embedding and the recipe embedding for the recipe of the example satisfy the one or more conditions, the online concierge system stops updating the one or more parameters of the machine learning recommendation model and stores the parameters of the machine learning recommendation model.

Similarly, a recipe embedding output by the recipe model of the machine learning recommendation model is also input into a cross-modal user set of layers. The cross-modal user set of layers receives the recipe embedding and generates a predicted user embedding representing a predicted user having at least a threshold likelihood of performing the specific interaction with the recipe corresponding to the recipe embedding. For examples of the training data including a user and a recipe and having a label indicating the user of the example performed the specific interaction with the recipe of the example, the recipe embedding output by the recipe model is input to the cross-modal user set of layers.

The online concierge system compares the predicted user embedding output by the cross-modal user set of layers to the user embedding output by the user model for the user of the example. A cross-modal loss function generates a cross-modal user error term from a difference between the predicted user embedding and the user embedding for the user of the example. The cross-modal user error term is backpropagated through layers of the machine learning recommendation model, such as the layers comprising the user model, to update one or more parameters of the machine learning recommendation model. Various loss functions, or combinations of loss functions, may be used to generate the cross-modal user error term from the difference between the predicted user embedding and the recipe embedding for the user of the example. The online concierge system may iteratively update the machine learning recommendation model a specified number of times or until one or more criteria are satisfied using any suitable supervised learning method. For example, the online concierge system iteratively updates the machine learning recommendation model until the cross-modal loss function based on the difference between the predicted user embedding and the user embedding for the user of the example satisfies one or more conditions. When the one or more cross-modal loss functions based on the difference between the predicted user embedding and the user embedding for the user of the example satisfy the one or more conditions, the online concierge system stops updating of the one or more parameters of the machine learning recommendation model and stores the parameters of the machine learning recommendation model.

When training the machine learning recommendation model, the classification layers, the cross-modal user set of layers, and the cross-modal recipe set of layers modify parameters of the user model and of the recipe model comprising the machine learning recommendation model so that the generated user embeddings and recipe embeddings, respectively, are aligned in a common latent space. This allows the user embeddings and the recipe embeddings to be more easily used for selecting recipes likely to be relevant to a user. Having user embeddings and recipe embeddings in the common latent space allows the online concierge system to more rapidly compare user embeddings and recipe embeddings. In various embodiments, the machine learning recommendation may include an additional set of layers comprising an item model that generates item embeddings based on attributes of items. The item model is trained as further described above, allowing user embeddings, item embeddings, and recipe embeddings to be aligned in a common latent space, simplifying comparison of items, recipes, and users by comparing their respective item embeddings, recipe embeddings, and user embeddings.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Architecture

Figure 1:
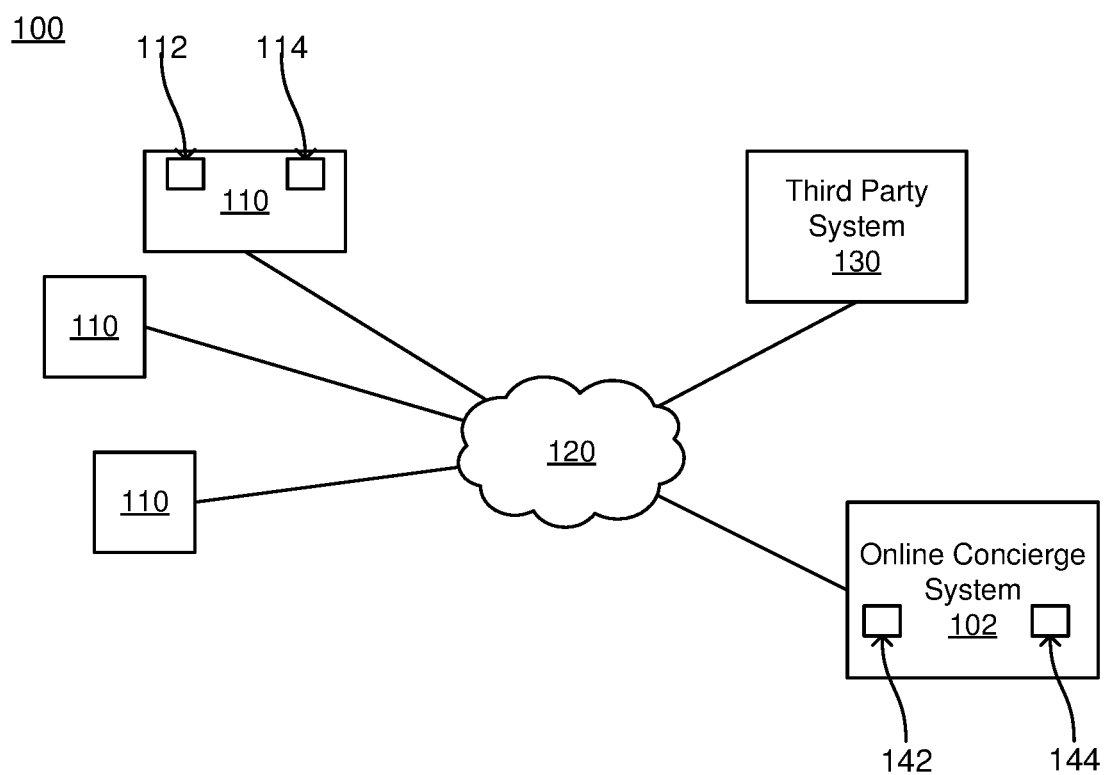
FIG. 1 is a block diagram of a system environment in which an online system, such an online concierge system, operates, according to one embodiment.

FIG. 1 is a block diagram of a system environment 100 in which an online system, such as an online concierge system 102 as further described below in conjunction with FIGS. 2 and 3, operates. The system environment 100 shown by FIG. 1 comprises one or more client devices 110, a network 120, one or more third-party systems 130, and the online concierge system 102. In alternative configurations, different and/or additional components may be included in the system environment 100. Additionally, in other embodiments, the online concierge system 102 may be replaced by an online system configured to retrieve content for display to users and to transmit the content to one or more client devices 110 for display.

The client devices 110 are one or more computing devices capable of receiving user input as well as transmitting and/or receiving data via the network 120. In one embodiment, a client device 110 is a computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online concierge system 102. For example, the client device 110 executes a customer mobile application 206 or a shopper mobile application 212, as further described below in conjunction with FIGS. 4A and 4B, respectively, to enable interaction between the client device 110 and the online concierge system 102. As another example, a client device 110 executes a browser application to enable interaction between the client device 110 and the online concierge system 102 via the network 120. In another embodiment, a client device 110 interacts with the online concierge system 102 through an application programming interface (API) running on a native operating system of the client device 110, such as IOS® or ANDROID™.

A client device 110 includes one or more processors 112 configured to control operation of the client device 110 by performing functions. In various embodiments, a client device 110 includes a memory 114 comprising a non-transitory storage medium on which instructions are encoded. The memory 114 may have instructions encoded thereon that, when executed by the processor 112, cause the processor to perform functions to execute the customer mobile application 206 or the shopper mobile application 212 to provide the functions further described below in conjunction with FIGS. 4A and 4B, respectively.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online concierge system 102 or with the one or more client devices 110. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. For example, the third party system 130 stores one or more web pages and transmits the web pages to a client device 110 or to the online concierge system 102. The third party system 130 may also communicate information to the online concierge system 102, such as advertisements, content, or information about an application provided by the third party system 130.

The online concierge system 102 includes one or more processors 142 configured to control operation of the online concierge system 102 by performing functions. In various embodiments, the online concierge system 102 includes a memory 144 comprising a non-transitory storage medium on which instructions are encoded. The memory 144 may have instructions encoded thereon corresponding to the modules further below in conjunction with FIG. 3 that, when executed by the processor 142, cause the processor to perform the functionality further described below in conjunction with FIGS. 2, 5, and 6. For example, the memory 144 has instructions encoded thereon that, when executed by the processor 142, cause the processor 142 to train a recommendation model to generate user embeddings for users and recipe embeddings for recipes, as further described below in conjunction with FIGS. 5 and 6. Additionally, the online concierge system 102 includes a communication interface configured to connect the online concierge system 102 to one or more networks, such as network 120, or to otherwise communicate with devices (e.g., client devices 110) connected to the one or more networks.

One or more of a client device, a third party system 130, or the online concierge system 102 may be special purpose computing devices configured to perform specific functions, as further described below in conjunction with FIGS. 2-6, and may include specific computing components such as processors, memories, communication interfaces, and/or the like.

System Overview

Figure 2:
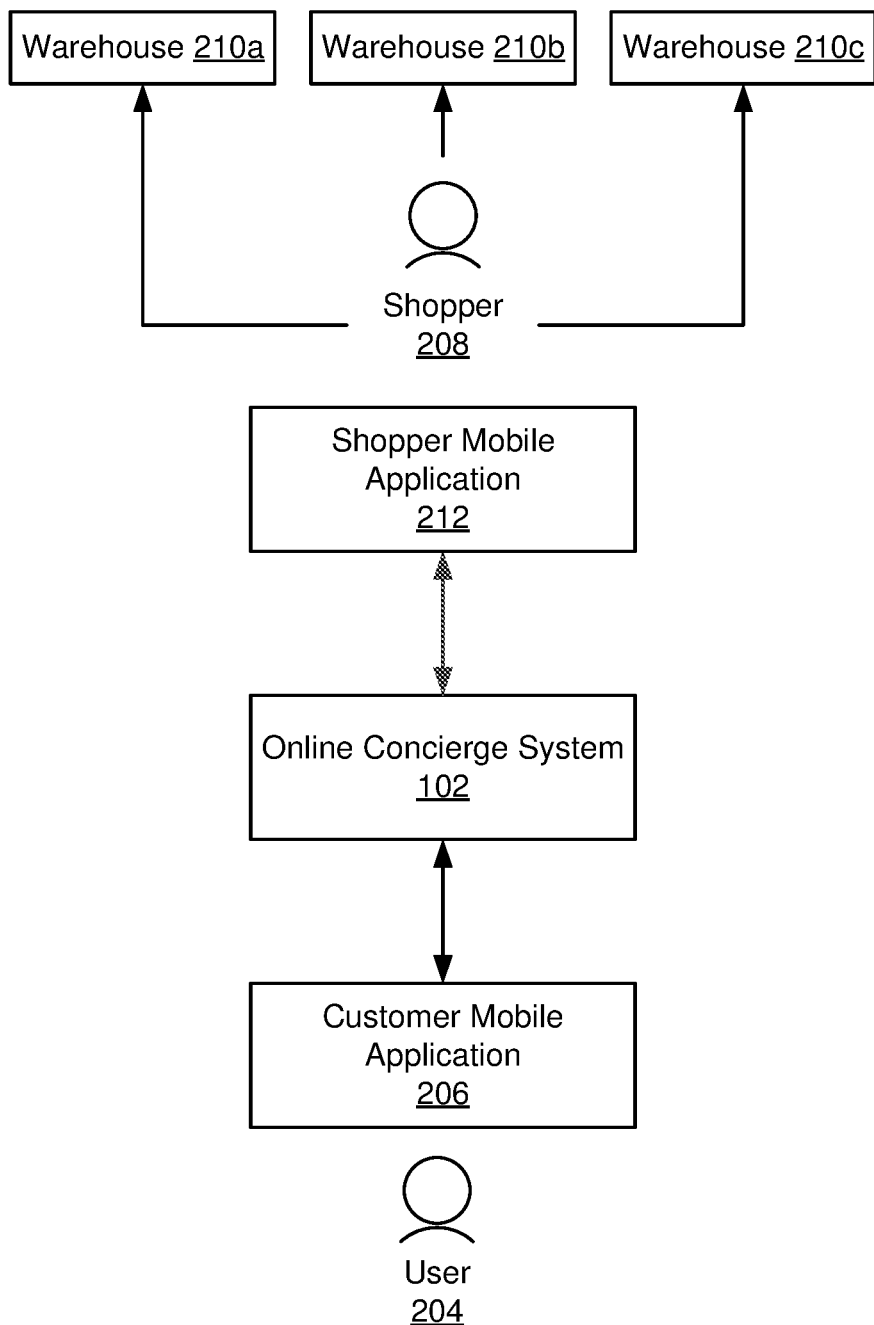
FIG. 2 illustrates an environment of an online shopping concierge service, according to one embodiment.

FIG. 2 illustrates an environment 200 of an online platform, such as an online concierge system 102, according to one embodiment. The figures use like reference numerals to identify like elements. A letter after a reference numeral, such as "210a," indicates that the text refers specifically to the element having that particular reference numeral. A reference numeral in the text without a following letter, such as "210," refers to any or all of the elements in the figures bearing that reference numeral. For example, "210" in the text refers to reference numerals "210a" or "210b" in the figures.

The environment 200 includes an online concierge system 102. The online concierge system 102 is configured to receive orders from one or more users 204 (only one is shown for the sake of simplicity). An order specifies a list of goods (items or products) to be delivered to the user 204. The order also specifies the location to which the goods are to be delivered, and a time window during which the goods should be delivered. In some embodiments, the order specifies one or more retailers from which the selected items should be purchased. The user may use a customer mobile application (CMA) 206 to place the order; the CMA 206 is configured to communicate with the online concierge system 102.

The online concierge system 102 is configured to transmit orders received from users 204 to one or more shoppers 208. A shopper 208 may be a contractor, employee, other person (or entity), robot, or other autonomous device enabled to fulfill orders received by the online concierge system 102. The shopper 208 travels between a warehouse and a delivery location (e.g., the user's home or office). A shopper 208 may travel by car, truck, bicycle, scooter, foot, or other mode of transportation. In some embodiments, the delivery may be partially or fully automated, e.g., using a self-driving car. The environment 200 also includes three warehouses 210a, 210b, and 210c (only three are shown for the sake of simplicity; the environment could include hundreds of warehouses). The warehouses 210 may be physical retailers, such as grocery stores, discount stores, department stores, etc., or non-public warehouses storing items that may be collected and delivered to users. Each shopper 208 fulfills an order received from the online concierge system 102 at one or more warehouses 210, delivers the order to the user 204, or performs both fulfillment and delivery. In one embodiment, shoppers 208 make use of a shopper mobile application 212 which is configured to interact with the online concierge system 102.

Figure 3:
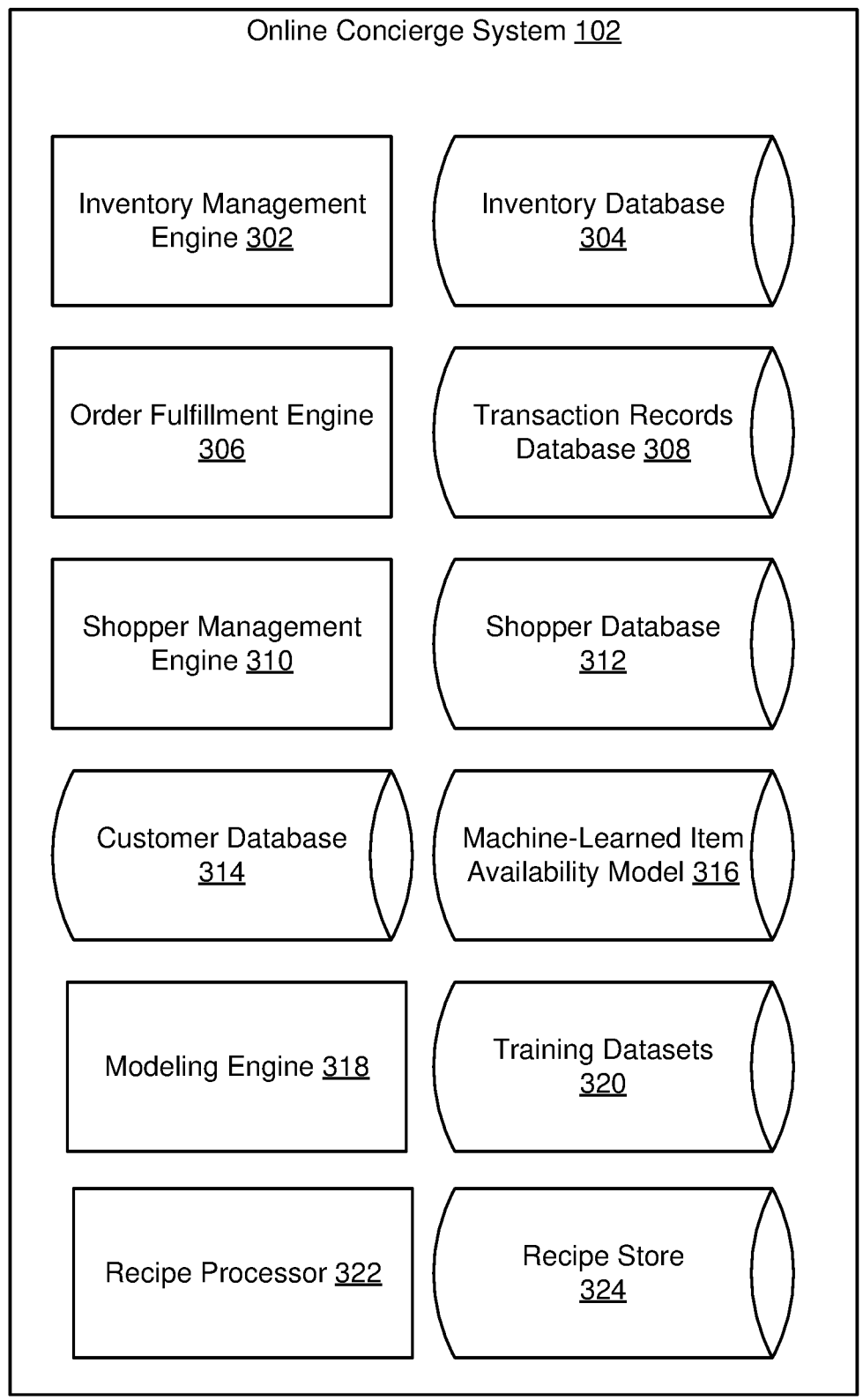
FIG. 3 is a diagram of an online shopping concierge system, according to one embodiment.

FIG. 3 is a diagram of an online concierge system 102, according to one embodiment. In various embodiments, the online concierge system 102 may include different or additional modules than those described in conjunction with FIG. 3. Further, in some embodiments, the online concierge system 102 includes fewer modules than those described in conjunction with FIG. 3.

The online concierge system 102 includes an inventory management engine 302, which interacts with inventory systems associated with each warehouse 210. In one embodiment, the inventory management engine 302 requests and receives inventory information maintained by the warehouse 210. The inventory of each warehouse 210 is unique and may change over time. The inventory management engine 302 monitors changes in inventory for each participating warehouse 210. The inventory management engine 302 is also configured to store inventory records in an inventory database 304. The inventory database 304 may store information in separate records—one for each participating warehouse 210—or may consolidate or combine inventory information into a unified record. Inventory information includes attributes of items that include both qualitative and qualitative information about items, including size, color, weight, SKU, serial number, and so on. In one embodiment, the inventory database 304 also stores purchasing rules associated with each item, if they exist. For example, age-restricted items such as alcohol and tobacco are flagged accordingly in the inventory database 304. Additional inventory information useful for predicting the availability of items may also be stored in the inventory database 304. For example, for each item-warehouse combination (a particular item at a particular warehouse), the inventory database 304 may store a time that the item was last found, a time that the item was last not found (a shopper looked for the item but could not find it), the rate at which the item is found, and the popularity of the item.

For each item, the inventory database 304 identifies one or more attributes of the item and corresponding values for each attribute of an item. For example, the inventory database 304 includes an entry for each item offered by a warehouse 210, with an entry for an item including an item identifier that uniquely identifies the item. The entry includes different fields, with each field corresponding to an attribute of the item. A field of an entry includes a value for the attribute corresponding to the attribute for the field, allowing the inventory database 304 to maintain values of different categories for various items.

In various embodiments, the inventory management engine 302 maintains a taxonomy of items offered for purchase by one or more warehouses 210. For example, the inventory management engine 302 receives an item catalog from a warehouse 210 identifying items offered for purchase by the warehouse 210. From the item catalog, the inventory management engine 302 determines a taxonomy of items offered by the warehouse 210. Different levels in the taxonomy provide different levels of specificity about items included in the levels. In various embodiments, the taxonomy identifies a category and associates one or more specific items with the category. For example, a category corresponds to "milk," and the taxonomy associates identifiers of different milk items (e.g., milk offered by different brands, milk having one or more different attributes, etc.), with the category to identify items within the category of "milk." Thus, the taxonomy maintains associations between a category and specific items offered by the warehouse 210 matching the category. In some embodiments, different levels in the taxonomy identify items with differing levels of specificity based on any suitable attribute or combination of attributes of the items. For example, different levels of the taxonomy specify different combinations of attributes for items, so items in lower levels of the hierarchical taxonomy have a greater number of attributes, corresponding to greater specificity in a category, while items in higher levels of the hierarchical taxonomy have a fewer number of attributes, corresponding to less specificity in a category. In various embodiments, higher levels in the taxonomy include less detail about items, so greater numbers of items are included in higher levels (e.g., higher levels include a greater number of items satisfying a broader category). Similarly, lower levels in the taxonomy include greater detail about items, so fewer numbers of items are included in the lower levels (e.g., lower levels include a fewer number of items satisfying a more specific category). The taxonomy may be received from a warehouse 210 in various embodiments. In other embodiments, the inventory management engine 302 applies a trained classification model to an item catalog received from a warehouse 210 to include different items in levels of the taxonomy, so application of the trained classification model associates specific items with categories corresponding to levels within the taxonomy.

Inventory information provided by the inventory management engine 302 may supplement the training datasets 320. Inventory information provided by the inventory management engine 302 may not necessarily include information about the outcome of picking a delivery order associated with the item, whereas the data within the training datasets 320 is structured to include an outcome of picking a delivery order (e.g., if the item in an order was picked or not picked).

The online concierge system 102 also includes an order fulfillment engine 306 which is configured to synthesize and display an ordering interface to each user 204 (for example, via the customer mobile application 206). The order fulfillment engine 306 is also configured to access the inventory database 304 in order to determine which products are available at which warehouse 210. The order fulfillment engine 306 may supplement the product availability information from the inventory database 304 with an item availability predicted by the machine learning item availability model 316. The order fulfillment engine 306 determines a sale price for each item ordered by a user 204. Prices set by the order fulfillment engine 306 may or may not be identical to in-store prices determined by retailers (which is the price that users 204 and shoppers 208 would pay at the retail warehouses). The order fulfillment engine 306 also facilitates transactions associated with each order. In one embodiment, the order fulfillment engine 306 charges a payment instrument associated with a user 204 when he/she places an order. The order fulfillment engine 306 may transmit payment information to an external payment gateway or payment processor. The order fulfillment engine 306 stores payment and transactional information associated with each order in a transaction records database 308.

In various embodiments, the order fulfillment engine 306 generates and transmits a search interface to a client device of a user for display via the customer mobile application 206. The order fulfillment engine 306 receives a query comprising one or more terms from a user and retrieves items satisfying the query, such as items having descriptive information matching at least a portion of the query. In various embodiments, the order fulfillment engine 306 leverages item embeddings for items to retrieve items based on a received query. For example, the order fulfillment engine 306 generates an embedding for a query and determines measures of similarity between the embedding for the query and item embeddings for various items included in the inventory database 304.

In some embodiments, the order fulfillment engine 306 also shares order details with warehouses 210. For example, after successful fulfillment of an order, the order fulfillment engine 306 may transmit a summary of the order to the appropriate warehouses 210. The summary may indicate the items purchased, the total value of the items, and in some cases, an identity of the shopper 208 and user 204 associated with the transaction. In one embodiment, the order fulfillment engine 306 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 306, which provides detail of all orders which have been processed since the last request.

The order fulfillment engine 306 may interact with a shopper management engine 310, which manages communication with and utilization of shoppers 208. In one embodiment, the shopper management engine 310 receives a new order from the order fulfillment engine 306. The shopper management engine 310 identifies the appropriate warehouse 210 to fulfill the order based on one or more parameters, such as a probability of item availability determined by a machine learning item availability model 316, the contents of the order, the inventory of the warehouses, and the proximity to the delivery location. The shopper management engine 310 then identifies one or more appropriate shoppers 208 to fulfill the order based on one or more parameters, such as the shoppers' proximity to the appropriate warehouse 210 (and/or to the user 204), his/her familiarity level with that particular warehouse 210, and so on. Additionally, the shopper management engine 310 accesses a shopper database 312 which stores information describing each shopper 208, such as his/her name, gender, rating, previous shopping history, and so on.

As part of fulfilling an order, the order fulfillment engine 306 and/or shopper management engine 310 may access a user database 314 which stores information describing each user. This information could include each user's name, address, gender, shopping preferences, favorite items, stored payment instruments, and so on.

In various embodiments, the order fulfillment engine 306 determines whether to delay display of a received order to shoppers for fulfillment by a time interval. In response to determining to delay the received order by a time interval, the order fulfillment engine 306 evaluates orders received after the received order and during the time interval for inclusion in one or more batches that also include the received order. After the time interval, the order fulfillment engine 306 displays the order to one or more shoppers via the shopper mobile application 212; if the order fulfillment engine 306 generated one or more batches including the received order and one or more orders received after the received order and during the time interval, the one or more batches are also displayed to one or more shoppers via the shopper mobile application 212.

Machine Learning Models

The online concierge system 102 further includes a machine learning item availability model 316, a modeling engine 318, and training datasets 320. The modeling engine 318 uses the training datasets 320 to generate the machine learning item availability model 316. The machine learning item availability model 316 can learn from the training datasets 320, rather than follow only explicitly programmed instructions. The inventory management engine 302, order fulfillment engine 306, and/or shopper management engine 310 can use the machine learning item availability model 316 to determine a probability that an item is available at a warehouse 210. The machine learning item availability model 316 may be used to predict item availability for items being displayed to or selected by a user or included in received delivery orders. A single machine learning item availability model 316 is used to predict the availability of any number of items.

The machine learning item availability model 316 may be configured to receive as inputs information about an item, the warehouse for picking the item, and the time for picking the item. The machine learning item availability model 316 may be adapted to receive any information that the modeling engine 318 identifies as indicators of item availability. At minimum, the machine learning item availability model 316 receives information about an item-warehouse pair, such as an item in a delivery order and a warehouse at which the order could be fulfilled. Items stored in the inventory database 304 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 304. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 304 and/or warehouse database and provide this extracted information as inputs to the item availability model 316.

The machine learning item availability model 316 contains a set of functions generated by the modeling engine 318 from the training datasets 320 that relate the item, warehouse, and timing information, and/or any other relevant inputs, to the probability that the item is available at a warehouse. Thus, for a given item-warehouse pair, the machine learning item availability model 316 outputs a probability that the item is available at the warehouse. The machine learning item availability model 316 constructs the relationship between the input item-warehouse pair, timing, and/or any other inputs and the availability probability (also referred to as "availability") that is generic enough to apply to any number of different item-warehouse pairs. In some embodiments, the probability output by the machine learning item availability model 316 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper or predicted to be unavailable but found by the shopper). In some examples, the confidence score is based in part on the age of the data for the item, e.g., if availability information has been received within the past hour, or the past day. The set of functions of the item availability model 316 may be updated and adapted following retraining with new training datasets 320. The machine learning item availability model 316 may be any machine learning model, such as a neural network, boosted tree, gradient boosted tree or random forest model. In some examples, the machine learning item availability model 316 is generated from XGBoost algorithm.

The item probability generated by the machine learning item availability model 316 may be used to determine instructions delivered to the user 204 and/or shopper 208, as described in further detail below.

The training datasets 320 relate a variety of different factors to known item availability from the outcomes of previous delivery orders (e.g., if an item was previously found or previously unavailable). The training datasets 320 include the items included in previous delivery orders, whether the items in the previous delivery orders were picked, warehouses associated with the previous delivery orders, and a variety of characteristics associated with each of the items (which may be obtained from the inventory database 304). Each piece of data in the training datasets 320 includes the outcome of a previous delivery order (e.g., if the item was picked or not). The item characteristics may be determined by the machine learning item availability model 316 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine learning item availability model 316 may weigh these factors differently, where the weights are a result of a "learning" or training process on the training datasets 320. The training datasets 320 are very large datasets taken across a wide cross section of warehouses, shoppers, items, delivery orders, times, and item characteristics. The training datasets 320 are large enough to provide a mapping from an item in an order to a probability that the item is available at a warehouse. In addition to previous delivery orders, the training datasets 320 may be supplemented by inventory information provided by the inventory management engine 302. In some examples, the training datasets 320 are historic delivery order information used to train the machine learning item availability model 316, whereas the inventory information stored in the inventory database 304 include factors input into the machine learning item availability model 316 to determine an item availability for an item in a newly received delivery order. In some examples, the modeling engine 318 may evaluate the training datasets 320 to compare a single item's availability across multiple warehouses to determine if an item is chronically unavailable. This may indicate that an item is no longer manufactured. The modeling engine 318 may query a warehouse 210 through the inventory management engine 302 for updated item information on these identified items.

In various embodiments, the modeling engine 318 trains and stores a recommendation model. As further described below in conjunction with FIGS. 5 and 6, the recommendation model receives characteristics of a user and attributes of a recipe and determines a measure of similarity between the user and the recipe. In various embodiments, the recommendation model is a two tower model that includes a set of layers comprising a user model and a separate set of layers comprising a recipe model. The user model outputs a user embedding for a user based on characteristics of the user, while the recipe model outputs a recipe embedding for a recipe based on attributes of the recipe. In various embodiments, user embeddings and recipe embeddings are in a common latent space, simplifying comparison of a recipe and a user.

To better align user embeddings and recipe embeddings in the common latent space, in various embodiments, the recommendation model includes a set of classification layers, such as a weight matrix, that receive a user embedding for a user and a recipe embedding for a recipe and outputs a predicted dietary type for the user embedding and a predicted dietary type for the recipe embedding. The modeling engine 318 computes a classification error term from a difference between the predicted dietary type for the user and recipe embedding and the corresponding label for the user and recipe under consideration. The modeling engine 318 then backpropagates the classification error term through the user model and the recipe model to improve accuracy of the user embeddings and the recipe embeddings. In some embodiments, the recommendation model also includes cross-modal recipe layers and cross-modal user layers. The cross-modal recipe layers receive a user embedding from the user model and generates a predicted recipe embedding for a recipe with which the user corresponding to the user embedding has at least a threshold probability of performing a specific interaction. Similarly, the cross-modal user layers receive a recipe embedding from the recipe model and generates a predicted user embedding for a user having at least the threshold probability of performing the specific interaction with the recipe corresponding to the recipe embedding. As further described below in conjunction with FIGS. 5 and 6, the modeling engine 318 further adjusts the user model and the recipe model based on differences between training examples and the user embeddings and the recipe embeddings.

The recommendation model may be used to select a recipe for an identified user based on an output measure of similarity between the user embedding for the identified user and recipe embeddings for recipes. Alternatively, the modeling engine 318 leverages user embeddings and recipe embeddings generated by the recommendation model to identify a set of candidate recipes for an identified user. For example, the candidate recipes are recipes having recipe embeddings within a threshold distance of the user embedding for the identified user. Using an additional model or other criteria, the modeling engine 318 selects one or more recipes of the set of candidate recipes for the identified user.

The recipe processor 322 obtains recipes from one or more sources. A recipe includes one or more items, such as a plurality of items, a quantity of each item, and may also include information describing how to combine the items in the recipe. Recipes may be obtained from users, third party systems (e.g., websites, applications), or any other suitable source and stored in the recipe store 324. Additionally, each recipe has one or more attributes describing the recipe. Example attributes of a recipe include an amount of time to prepare the recipe, a complexity of the recipe, nutritional information about the recipe, a genre of the recipe, or any other suitable information. Attributes of a recipe may be included in the recipe by a source from which the recipe was received or may be determined by the online concierge system 102 from items in the recipe or other information included in the recipe.

The recipe store 324 includes information identifying recipes obtained by the online concierge system 102. A recipe includes one or more items, such as a plurality of items, a quantity of each item, and may also include information describing how to combine the items in the recipe. Recipes may be obtained from users, third party systems (e.g., websites, applications), or any other suitable source and stored in the recipe store 324. Additionally, each recipe has one or more attributes describing the recipe. Example attributes of a recipe include an amount of time to prepare the recipe, a complexity of the recipe, nutritional information about the recipe, a genre of the recipe, or any other suitable information. Attributes of a recipe may be included in the recipe by a source from which the recipe was received or may be determined by the online concierge system 102 from items in the recipe or other information included in the recipe.

In some embodiments, the recipe store 324 maintains a recipe graph identifying connections between recipes in the recipe store 324 in some embodiments. A connection between a recipe and another recipe indicates that the connected recipes each have one or more common attributes. In some embodiments, a connection between a recipe and another recipe indicates that a user included items from each connected recipe in a common order or included items from each connected recipe in orders the online concierge system received from the user within a threshold amount of time from each other. In various embodiments, each connection between recipes includes a value, with the value providing an indication of a strength of a connection between the recipes.

Machine Learning Factors

The training datasets 320 include a time associated with previous delivery orders. In some embodiments, the training datasets 320 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 320 include a day of the week previous delivery orders were placed. The day of the week may impact item availability since popular shopping days may have reduced inventory of items or restocking shipments may be received on particular days. In some embodiments, training datasets 320 include a time interval since an item was previously picked in a previously delivered order. If an item has recently been picked at a warehouse, this may increase the probability that it is still available. If there has been a long time interval since an item has been picked, this may indicate that the probability that it is available for subsequent orders is low or uncertain. In some embodiments, training datasets 320 include a time interval since an item was not found in a previous delivery order. If there has been a short time interval since an item was not found, this may indicate that there is a low probability that the item is available in subsequent delivery orders. And conversely, if there has been a long time interval since an item was not found, this may indicate that the item may have been restocked and is available for subsequent delivery orders. In some examples, training datasets 320 may also include a rate at which an item is typically found by a shopper at a warehouse, a number of days since inventory information about the item was last received from the inventory management engine 302, a number of times an item was not found in a previous week, or any number of additional rate or time information. The relationships between this time information and item availability are determined by the modeling engine 318 training a machine learning model with the training datasets 320, producing the machine learning item availability model 316.

The training datasets 320 may include item attributes. In some examples, the item attributes include a department associated with the item. For example, if the item is yogurt, it is associated with the dairy department. The department may be the bakery, beverage, nonfood, and pharmacy, produce and floral, deli, prepared foods, meat, seafood, dairy, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability since different aisles of a warehouse may be more frequently re-stocked than others. Additionally, or alternatively, the item attributes include an item popularity score. The item popularity score for an item may be proportional to the number of delivery orders received that include the item. An alternative or additional item popularity score may be provided by a retailer through the inventory management engine 302. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item attributes may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 318 training a machine learning model with the training datasets 320, producing the machine learning item availability model 316.

The training datasets 320 may include additional item characteristics that affect the item availability and can therefore be used to build the machine learning item availability model 316 relating the delivery order for an item to its predicted availability. The training datasets 320 may be periodically updated with recent previous delivery orders. The training datasets 320 may be updated with item availability information provided directly from shoppers 208. Following updating of the training datasets 320, a modeling engine 318 may retrain a model with the updated training datasets 320 and produce a new machine learning item availability model 316.

Customer Mobile Application

Figure 4A:
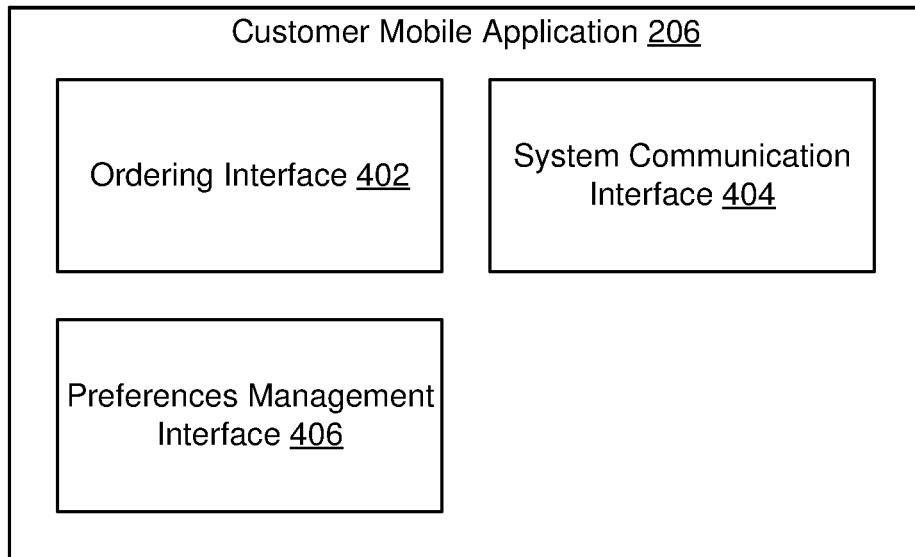
FIG. 4A is a diagram of a customer mobile application (CMA), according to one embodiment.

FIG. 4A is a diagram of the customer mobile application (CMA) 206, according to one embodiment. The CMA 206 includes an ordering interface 402, which provides an interactive interface with which the user 204 can browse through and select products and place an order. The CMA 206 also includes a system communication interface 404 which, among other functions, receives inventory information from the online shopping concierge system 102 and transmits order information to the online concierge system 102. The CMA 206 also includes a preferences management interface 406 which allows the user 204 to manage basic information associated with his/her account, such as his/her home address and payment instruments. The preferences management interface 406 may also allow the user to manage other details such as his/her favorite or preferred warehouses 210, preferred delivery times, special instructions for delivery, and so on.

Shopper Mobile Application

Figure 4B:
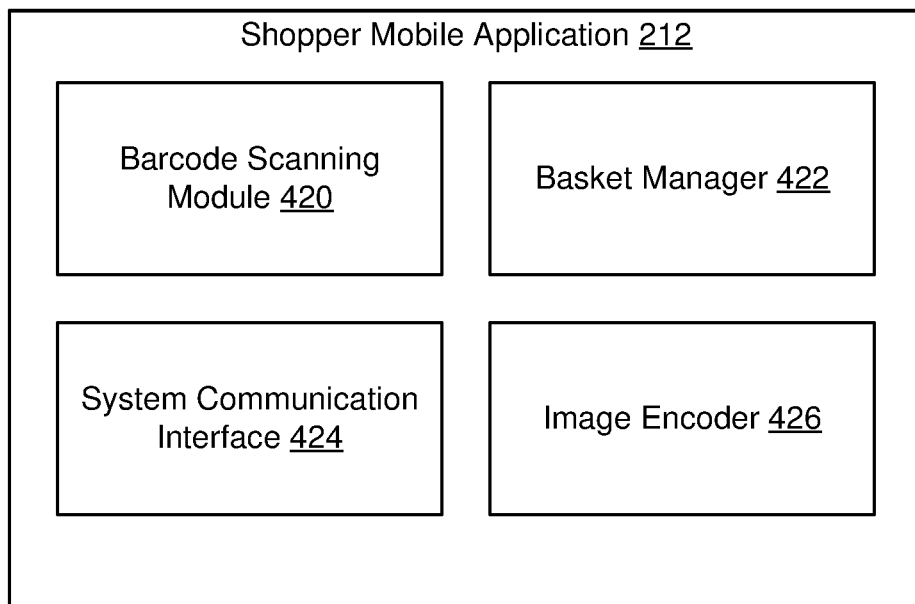
FIG. 4B is a diagram of a shopper mobile application (SMA), according to one embodiment.

FIG. 4B is a diagram of the shopper mobile application (SMA) 212, according to one embodiment. The SMA 212 includes a barcode scanning module 420 which allows a shopper 208 to scan an item at a warehouse 210 (such as a can of soup on the shelf at a grocery store). The barcode scanning module 420 may also include an interface which allows the shopper 208 to manually enter information describing an item (such as its serial number, SKU, quantity and/or weight) if a barcode is not available to be scanned. SMA 212 also includes a basket manager 422 which maintains a running record of items collected by the shopper 208 for purchase at a warehouse 210. This running record of items is commonly known as a "basket." In one embodiment, the barcode scanning module 420 transmits information describing each item (such as its cost, quantity, weight, etc.) to the basket manager 422, which updates its basket accordingly. The SMA 212 also includes a system communication interface 424 which interacts with the online shopping concierge system 102. For example, the system communication interface 424 receives an order from the online concierge system 102 and transmits the contents of a basket of items to the online concierge system 102. The SMA 212 also includes an image encoder 426 which encodes the contents of a basket into an image. For example, the image encoder 426 may encode a basket of goods (with an identification of each item) into a QR code which can then be scanned by an employee of the warehouse 210 at check-out.

Figure 5:
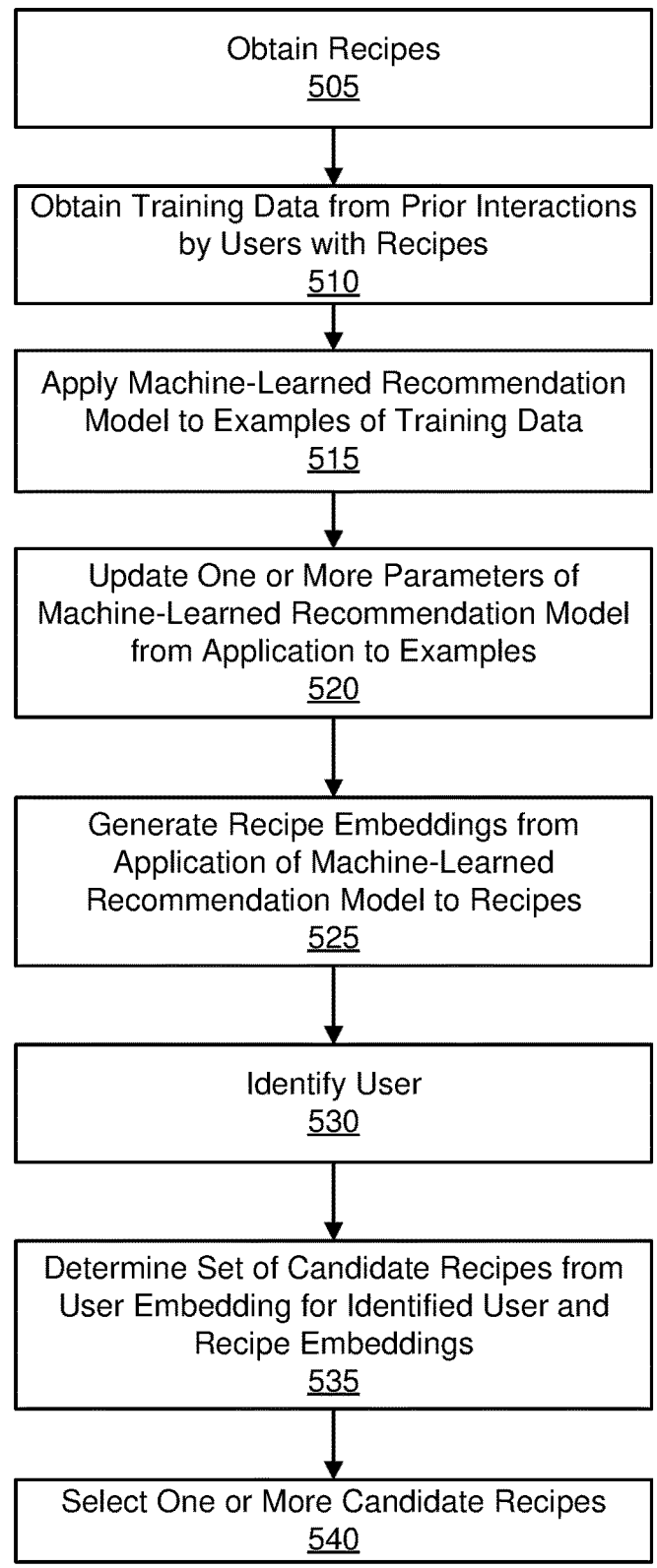
FIG. 5 is a flowchart of one embodiment of a method for training a recommendation model to generate user embeddings for users and recipe embeddings for recipes, in accordance with an embodiment.

Training a Machine Learning Model to Generate User Embeddings and Recipe Embeddings FIG. 5 is a flowchart of one embodiment of a method for training a recommendation model to generate user embeddings for users and recipe embeddings for recipes. In various embodiments, the method includes different or additional steps than those described in conjunction with FIG. 5. Further, in some embodiments, the steps of the method may be performed in different orders than the order described in conjunction with FIG. 5. The method described in conjunction with FIG. 5 may be carried out by the online concierge system 102 in various embodiments, while in other embodiments, the steps of the method are performed by any online system capable of retrieving items.

An online concierge system 102 obtains 505 recipes from one or more sources. Example sources include a warehouse 210 or a third party system 130 (e.g., a website) exchanging information with the online concierge system 102. Each recipe includes one or more items, or a plurality of items. A recipe may include a quantity corresponding to each item included in the recipe. Additionally, a recipe may include instructions for combining items included in the recipe. The online concierge system 102 stores recipes from one or more sources in a recipe store 324 in some embodiments.

To simplify user interaction, the online concierge system 102 may display one or more recipes to a user, allowing the user to select items included in a displayed recipe in an order. Displaying one or more recipes to a user allows the online concierge system 102 to display a greater range of items to the user, increasing a number of potential items for the user to include in an order. However, displaying recipes to a user that are less relevant to a user may decrease subsequent interactions by the user with the online concierge system 102. For example, displaying recipes including items that contradict a user's dietary preferences or dietary restrictions would increase an amount of time spent by a user to navigate from the displayed recipes to identify items or recipes consistent with the user's dietary preferences or dietary restrictions. To increase a likelihood of the online concierge system 102 selecting recipes for display to a user that are relevant to the user, the online concierge system 102 trains a machine learning recommendation model that determines a measure of relevance of a recipe to a user. In various embodiments, the machine learning recommendation model includes a set of layers comprising a user model and a different set of layers comprising a recipe model, so the machine learning recommendation model has a two-tower architecture, as further described below and in conjunction with FIG. 6.

To train the machine learning recommendation model, the online concierge system 102 obtains 510 training data from prior interactions by users with items or with recipes. In various embodiments, the online concierge system 102 retrieves the prior interactions from information in the transaction records database 308. From the prior interactions, the online concierge system 102 generates examples that each include a user and a recipe. A label is applied to each example that indicates whether the user performed a specific interaction with the recipe. For example, a label indicates whether a user included one or more items included in a recipe in an order. As another example, a label indicates whether a user selected the recipe via the online concierge system 102. In other embodiments, the online concierge system 102 uses performance of alternative specific interactions by a user with a recipe to determine a label to apply to a user and a recipe in an example. The label applied to an example has a specific value in response to the user of the example having performed the specific interaction with the recipe of the example and has an alternative value in response to the user of the example not having performed the specific interaction with the recipe of the example.

To represent a user of the online concierge system 102, an example includes a set of characteristics of the user. Example characteristics of the user include items included in orders previously received from the user, dietary preferences stored in association with the user, a geographic location of the user, and other information describing interactions performed by the user or descriptive information maintained for the user. Characteristics of a user may include a location of the user, such as a location of the user the online concierge system 102 obtained from a customer mobile application 206 executing on a client device of the user when the user interacts with the online concierge system 102. Using location information allows the online concierge system 102 to account for spatial information about the user that may influence items or recipes of interest to the user. In various embodiments, the example includes different combinations of characteristics of the user to represent the user.

To represent a recipe, an example includes a set of attributes of the recipe. Attributes of the recipe include item embeddings of items included in the recipe. An item embedding of an item may be generated by the online concierge system 102 applying a trained item model to attributes of the item obtained by the online concierge system. Item embeddings for items may be obtained from other sources in various embodiments. As different recipes may include different numbers of items, in some embodiments the online concierge system 102 applies a regularization model to the set of item embeddings corresponding to items included in the recipe. The regularization model receives item embeddings as input and outputs a fixed length embedding, allowing the online concierge system 102 to aggregate item embeddings of multiple items included in a recipe to output a fixed-length combined item embedding for the recipe that represents the combination of items included in the recipe.

Additional attributes of a recipe include term embeddings obtained from names of the items included in the recipe. The online concierge system 102 applies one or more methods, such as Word2Vec, GloVE, or bidirectional encoder representations from transformers, to text names of items included in a recipe to generate a term embedding for each item included in the recipe. In other embodiments, the online concierge system 102 may use other models, or combinations of models, to generate a term embedding from a textual name of an item included in the recipe. The online concierge system 102 may also determine a document embedding for the recipe from instructions in the recipe for combining items included in the recipe. In various embodiments, the online concierge system 102 applies a document embedding model, such as a long short-term memory (LSTM) model or Doc2Vec, to text in the recipe comprising instructions for combining ingredients included in the recipe to generate the document embedding for the recipe. In other embodiments, the online concierge system 102 may apply other document embedding models to generate the document embedding for the recipe. If a recipe includes nutritional information, the online concierge system 102 applies the document embedding model to the instructions in the recipe for combining items included in the recipe and the nutritional information included in the recipe to generate the document embedding for the recipe. Further, in embodiments where a recipe includes one or more images, one or more attributes of the recipe include image embeddings generated for each of the one or more images included in the recipe. For example, the online concierge system 102 applies a convolutional neural network, such a residual neural network, to an image included in the recipe to output an image embedding for the image. Various convolutional networks may be used to generate an item embedding in different embodiments.

In some embodiments, an attribute of a recipe includes one or more salient items of the recipe. For example, the online concierge system 102 determines if an item is a salient item of the recipe based on a quantity of the item specified by the recipe and quantities of the item specified by other recipes. In an example, the online concierge system 102 identifies an item as a salient item of the recipe when a quantity of the item specified by the recipe is greater than a value for the quantity of the item specified in other recipes (e.g., a mean quantity of the item specified in other recipes, a median quantity of the item specified in other recipes, etc.). As another example, the online concierge system 102 identifies an item as a salient item of the recipe in response to a quantity of the item specified by the recipe exceeding a serving size for the item, determined from information stored in association with the item. The online concierge system 102 may normalize the quantity of the item included in the recipe, the value for the quantity of the item specified in other recipes, or the serving size of the item in some embodiments. In other embodiments, the online concierge system 102 determines a weight of an item included in a recipe based on term frequency-inverse document frequency that accounts for a number of the obtained recipes that include the item; a salient item for the recipe is an item with at least a threshold weight or an item having at least a threshold position in a ranking of items of the recipe based on their corresponding weights.

While the preceding examples of attributes of a recipe are generated from information comprising the recipe (e.g., items, instructions for combining the items, images included in the recipe, etc.), other attributes of the recipe may be contextual information describing the recipe. For example, the online concierge system 102 determines a number of one or more particular interactions with a recipe by users or a frequency with which users perform the one or more particular interactions with the recipe. Example particular interactions include viewing the recipe, saving the recipe to an account associated with a user, indicating a preference for the recipe, and including the recipe (or a threshold amount of items included in the recipe) in an order. When determining the number of the one or more particular interactions performed with the recipe or the frequency with which the one or more particular interactions were performed, the online concierge system 102 may account for interactions with the one or more recipes occurring external to the online concierge system 102, such as interactions occurring with one or more third party systems 130 displaying or presenting the recipe to users.

As another example, the online concierge system 102 identifies one or more other recipes based on measures of similarity between items included in a recipe and items included in a recipe as an attribute of the recipe. For example, the online concierge system 102 identifies an additional recipe including at least a threshold number (or a threshold amount) of items that have at least a threshold measure of similarity to items included in the recipe. In some embodiments, the online concierge system 102 determines the measure of similarity between an item included in the recipe and an additional item included in the additional recipe as a measure of similarity (e.g., a dot product, a cosine similarity) between an item embedding of the item and an additional item embedding of the additional item. The measure of similarity between the recipe and an additional recipe may be determined from measures of similarity between salient items of the recipe and salient items of the additional recipe. As another example, an attribute of a recipe includes a value indicating one or more items included in the recipe have been purchased by users of the online concierge system 102 with at least a threshold frequency (e.g., a threshold frequency during a specific time interval). In another example, an attribute of a recipe comprises a measure of similarity between the recipe and one or more items with a common category in a taxonomy maintained by the online concierge system; the attribute identifies an item with the common category and the measure of similarity between the item and the recipe. An attribute of a recipe may be a measure of similarity between the recipe and an item that is associated with instructions specifying additional items, where the additional items match at least a threshold number of items in the recipe. The attribute may specify the item associated with the additional items and the measure of similarity between the recipe and the item associated with the additional items in some embodiments. Another attribute of a recipe identifies additional recipes having a common cultural classification as a recipe or additional recipes associated with a common occasion (e.g., holiday) as the recipe.

The online concierge system 102 applies 515 the machine learning recommendation model to each of a plurality of examples of the training data. When applying 515 the machine learning recommendation model to an example, features of the user of the example are input to the layers of the machine learning recommendation model comprising the user model, while features of the recipe of the example are input to the layers of the machine learning recommendation model comprising the recipe model. The user model outputs a user embedding for the user of the example, while the recipe model outputs a recipe embedding for the recipe of the example. The machine learning recommendation model determines a measure of similarity between the user embedding from the user model and the recipe embedding from the recipe model and outputs the measure of similarity. For example, the machine learning recommendation model outputs a dot product or a cosine similarity between the user embedding and the recipe embedding. In other embodiments, the machine learning recommendation model minimizes a triplet loss. However, other measures of similarity between the user embedding and the recipe embedding may be output by the machine learning recommendation model in other embodiments.

To train the machine learning recommendation model, the online concierge system 102 initializes a network of a plurality of layers that comprises the machine learning recommendation model and applies 515 the machine learning model to the labeled examples of the training data. For an example of the training data, the online concierge system 102 inputs characteristics of the user of the example to the layers comprising the user model and inputs attributes of the recipe of the example to the layers comprising the recipe model. From the user embedding output from the user model and the recipe embedding output from the recipe model, the machine learning recommendation model outputs a predicted measure of similarity between the user of the example and the recipe of the example.

The online concierge system 102 compares the predicted measure of similarity between the user of the example and the recipe of the example to the label applied to the example. If the comparison indicates the predicted measure of similarity differs from the label applied to the example (e.g., the predicted measure of similarity is less than a threshold for performing the specific interaction with the recipe when the label indicates the specific interaction with the recipe was performed or the predicted measure of similarity is above a threshold for performing the specific interaction with the item when the label indicates the specific interaction was not performed), the machine learning recommendation model updates 520 one or more parameters of the machine learning recommendation model using one or more supervised learning methods. For example, the online concierge system 102 backpropagates the one or more error terms from the difference between label applied to the example of the training data and the output of the machine learning recommendation model. One or more parameters of the machine learning recommendation model are modified through any suitable technique from the backpropagation of the one or more error terms through the layers comprising the user model and through the layers comprising the recipe model. The one or more error terms may be generated through any suitable loss function, or combination of loss functions, in various embodiments. The online concierge system 102 may iteratively update the machine learning recommendation model a specified number of times or until one or more criteria are satisfied using any suitable supervised learning method. For example, the online concierge system 102 iteratively updates the machine learning recommendation model until a loss function based on a difference between a label applied to an example of the training data and a measure of similarity generated by the machine learning recommendation model satisfies one or more conditions. When the one or more loss functions satisfy the one or more conditions, the online concierge system 102 stops updating 520 of the one or more parameters of the machine learning recommendation model and stores the parameters of the machine learning recommendation model.

Additionally, the machine learning relevance model includes a set of classification layers, such as a weight matrix, configured to receive a user embedding from the user model and to receive a recipe embedding from the recipe model. The set of classification layers output a predicted dietary preference type from the input user embedding and the input recipe embedding in some embodiments, while in other embodiments the set of classification layers outputs a vector of probabilities that each correspond to a different dietary preference. Example dietary preference types include vegetarian, vegan, gluten free, and other descriptions of characteristics of items. In some embodiments, the set of classification layers forms a neural network.

When training the machine learning recommendation model, the online concierge system 102 obtains classification examples that each include a classified user and a classified recipe. In some embodiments, training data includes the set of classification examples. A classification label is applied to each classification example specifying a dietary preference type corresponding to the classified user and to the classified recipe. In various embodiments, a classification label specifies a dietary preference type corresponding to the classified user and another classification label specifies a dietary preference type corresponding to the classified recipe. The dietary preference of a recipe may be retrieved from a field included in the recipe or may be derived from items included in the recipe. Similarly, the dietary preference of a user may be stored in an account maintained for the user by the online concierge system 102, may be specified by an input received from the user, or may be derived from attributes of items the user has previously included in orders over time. In some embodiments, the classification examples are a subset of the examples of the training data further described above, while in other embodiments the classification examples are obtained from separate classification training data.

The online concierge system 102 applies 515 the machine learning recommendation model to a plurality of the labeled classification examples. For a classification example, the online concierge system 102 inputs characteristics of the classified user of the classification example to the layers comprising the user model and inputs attributes of the classified recipe of the classification example to the layers comprising the recipe model. The user embedding output from the user model and the recipe embedding output from the recipe model are received by the set of classification layers, which output a predicted dietary preference type for the user embedding and a predicted dietary preference type for the recipe embedding.

The online concierge system 102 compares the predicted dietary preference type for the classified user to a classification label applied to the classified user by the classification example. Similarly, the online concierge system 102 compares the predicted dietary preference for the classified recipe to the classification label applied to the classified recipe by the classification example If the comparison indicates the predicted dietary preference type for the classified user differs from the dietary preference type specified by the classification label applied to the classified user by the classification example, the machine learning recommendation model updates 520 one or more parameters of the machine learning model using one or more supervised learning methods. Similarly, the machine learning recommendation model updates 520 one or more parameters of the machine learning model using one or more supervised learning methods in response to the comparison indicating the predicted dietary preference type for the classified recipe differs from the dietary preference type specified by the classification label applied to the classified recipe by the classification example. For example, the online concierge system 102 backpropagates one or more classification error terms generated from a difference between the predicted dietary preference type for the classified user of classification example and the dietary preference type specified by the classification label applied to the classification example or one or more classification error terms generated from a difference between the predicted dietary preference type for the classified recipe of classification example and the dietary preference type specified by the classification label applied to the classification example. The one or more classification error terms are generated by a suitable loss function, or combination of loss functions, based on a difference between the predicted dietary preference type for the classification example and the dietary preference type specified by the classification label applied to the classification example; different implementations may use different loss functions to generate the one or more error terms. One or more parameters of the machine learning recommendation model are modified through any appropriate technique from the backpropagation of the one or more classification error terms through the layers comprising the user model and through the layers comprising the recipe model.

The online concierge system 102 may iteratively update the machine learning recommendation model a specified number of times or until one or more criteria are satisfied using any suitable supervised learning method. For example, the online concierge system 102 iteratively updates the machine learning recommendation model until a loss function based on a difference between the predicted dietary preference type for a classified recipe or for a classified user and the dietary preference type specified by the label applied to the classified recipe or to the classified user, respectively, satisfies one or more conditions. When the one or more loss functions satisfy the one or more conditions, the online concierge system 102 stops modification of the one or more parameters of the machine learning recommendation model and stores the parameters of the machine learning recommendation model.

In various embodiments, the online concierge system 102 applies the machine learning recommendation model to the plurality of classification examples after applying the machine learning recommendation model to the examples of the training data. Including the set of classification layers in the machine learning recommendation model and for training the machine learning recommendation model allows the online concierge system 102 to better regularize the generated user embeddings and the generated recipe embeddings in a common latent space. This regularization allows the machine learning recommendation model to generate user embeddings and recipe embeddings that may be more readily compared to each other, allowing the online concierge system 102 to represent the user embeddings and the recipe embeddings in a common latent space that allows identification of recipe embeddings based on a user embedding, as further described below.

In some embodiments, rather than include the set of classification layers in the machine learning recommendation model, a set of layers of the machine learning recommendation model comprise a generative adversarial network. In such embodiments, the generative adversarial network receives a user embedding or a recipe embedding and is trained until a discriminative portion of the generative adversarial network is unable to classify whether the received embedding is a user embedding or is a recipe embedding. As further described above regarding the weight matrix, this training allows the online concierge system 102 to represent the user embeddings and the recipe embeddings in a common latent space that allows identification of recipe embeddings based on a user embedding.

To further align generated user embeddings and recipe embeddings in a common latent space, a user embedding output by the user model of the machine learning recommendation model is also input into a cross-modal recipe set of layers. The cross-modal recipe set of layers receives the user embedding and generates a predicted recipe embedding representing a predicted recipe with which the user corresponding to the user embedding has at least a threshold likelihood of performing the specific interaction used to generate the examples of the training data. For examples of the training data including a user and a recipe and having a label indicating the user of the example performed the specific interaction with the recipe of the example, the user embedding output by the user model is input to the cross-modal recipe set of layers.

The online concierge system 102 compares the predicted recipe embedding output by the cross-modal recipe set of layers to the recipe embedding output by the recipe model for the recipe of the example. A cross-modal loss function generates a cross-modal recipe error term from a difference between the predicted recipe embedding and the recipe embedding for the recipe of the example. The cross-modal recipe error term is backpropagated through layers of the machine learning recommendation model, such as the layers comprising the recipe model, to update 520 one or more parameters of the machine learning recommendation model. Various loss functions, or combinations of loss functions, may be used to generate the cross-modal recipe error term from the difference between the predicted recipe embedding and the recipe embedding for the recipe of the example. The online concierge system 102 may iteratively update the machine learning recommendation model a specified number of times or until one or more criteria are satisfied using any suitable supervised learning method. For example, the online concierge system 102 iteratively updates the machine learning recommendation model until the cross-modal loss function based on the difference between the predicted recipe embedding and the recipe embedding for the recipe of the example satisfies one or more conditions. When the one or more cross-modal loss functions based on the difference between the predicted recipe embedding and the recipe embedding for the recipe of the example satisfy the one or more conditions, the online concierge system 102 stops updating 520 of the one or more parameters of the machine learning recommendation model and stores the parameters of the machine learning recommendation model.

Similarly, a recipe embedding output by the recipe model of the machine learning recommendation model is also input into a cross-modal user set of layers. The cross-modal user set of layers receives the recipe embedding and generates a predicted user embedding representing a predicted user having at least a threshold likelihood of performing the specific interaction with the recipe corresponding to the recipe embedding. For examples of the training data including a user and a recipe and having a label indicating the user of the example performed the specific interaction with the recipe of the example, the recipe embedding output by the recipe model is input to the cross-modal user set of layers.

The online concierge system 102 compares the predicted user embedding output by the cross-modal user set of layers to the user embedding output by the user model for the user of the example. A cross-modal loss function generates a cross-modal user error term from a difference between the predicted user embedding and the user embedding for the user of the example. The cross-modal user error term is backpropagated through layers of the machine learning recommendation model, such as the layers comprising the user model, to update 520 one or more parameters of the machine learning recommendation model. Various loss functions, or combinations of loss functions, may be used to generate the cross-modal user error term from the difference between the predicted user embedding and the user embedding for the user of the example. The online concierge system 102 may iteratively update the machine learning recommendation model a specified number of times or until one or more criteria are satisfied using any suitable supervised learning method. For example, the online concierge system 102 iteratively updates the machine learning recommendation model until the cross-modal loss function based on the difference between the predicted user embedding and the user embedding for the user of the example satisfies one or more conditions. When the one or more cross-modal loss functions based on the difference between the predicted user embedding and the user embedding for the user of the example satisfy the one or more conditions, the online concierge system 102 stops updating 520 of the one or more parameters of the machine learning recommendation model and stores the parameters of the machine learning recommendation model.

When training the machine learning recommendation model, the weight matrix, the cross-modal user set of layers, and the cross-modal recipe set of layers modify parameters of the user model and of the recipe model comprising the machine learning recommendation model so the generated user embeddings and recipe embeddings, respectively, are aligned in the common latent space. This allows the user embeddings and the recipe embeddings to be more easily used for selecting recipes likely to be relevant to a user. Having user embeddings and recipe embeddings in the common latent space allows the online concierge system 102 to more rapidly compare user embeddings and recipe embeddings.

Figure 6:
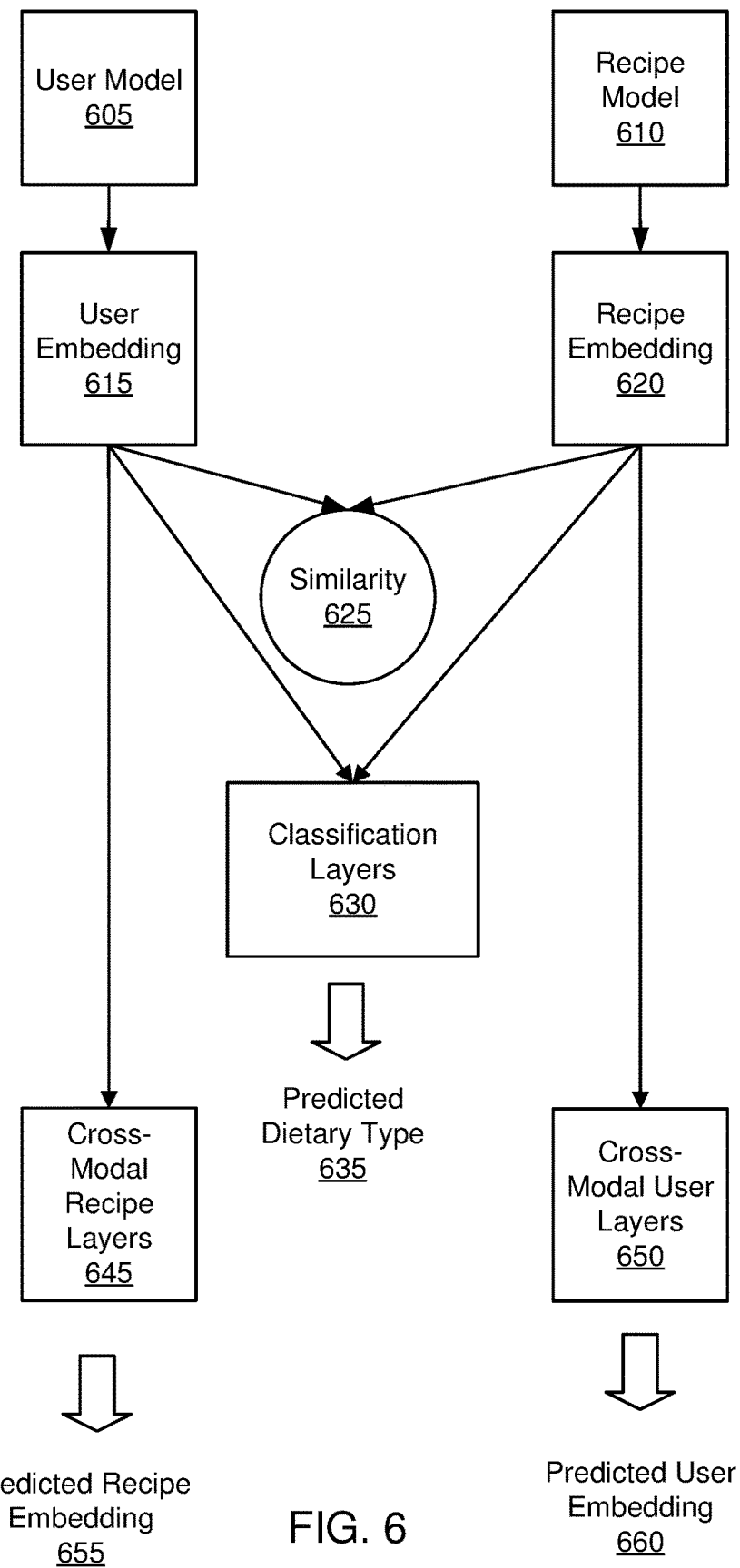
FIG. 6 is a block diagram of one embodiment of a recommendation model trained by the online concierge system, in accordance with an embodiment.

FIG. 6 is a block diagram of one embodiment of the machine learning recommendation model 600 trained by the online concierge system 102. As further described above in conjunction with FIG. 5, the machine learning recommendation model 600 includes a set of layers comprising a user model 605 and a separate set of layers comprising a recipe model 610. The user model 605 receives characteristics of a user as input and outputs a user embedding 615 for the user, as further described above in conjunction with FIG. 5. Similarly, the recipe model 610 receives attributes of a recipe as input and outputs a recipe embedding 620 for the recipe, as further described above in conjunction with FIG. 5.

The user embedding 615 and the recipe embedding 620 are input into one or more layers that output a measure of similarity 625 between the user embedding 615 and the recipe embedding 620. For example, the measure of similarity 625 is a dot product or a cosine similarity between the user embedding 615 and the recipe embedding 620. In other embodiments, other metrics may be generated as the measure of similarity 625 between the user embedding 615 and the recipe embedding 620. As further described above in conjunction with FIG. 5, when training the machine learning recommendation model 600, an example including characteristics of a user and attributes of a recipe is input into the machine learning recommendation model 600. A difference between the measure of similarity 630 output for user embedding 615 and the recipe embedding 620 and a label applied to an example including a corresponding user and recipe is used to generate an error term. The error term is backpropagated through the layers of the user model 605 and layers of the recipe model 610 to modify one or more weights between layers of the user model 605 and layers of the recipe model 610, as further described above. This backpropagation allows the online concierge system 102 to increase accuracy of the user embeddings 615 and the recipe embeddings 620.

To further improve the accuracy of the user embeddings 615 and of the recipe embeddings 620, the machine learning recommendation model 600 includes a set of classification layers 630, such as a weight matrix. The set of classification layers 630 also receives a user embedding 615 from the user model 605 and a recipe embedding 620 from the recipe model 610 as inputs and outputs a predicted dietary type 635 for the recipe embedding 620 and a predicted dietary type for the user embedding 615. While the example trained machine learning recommendation model 600 outputs a predicted dietary type 635, in other embodiments the weight matrix 630 outputs a predicted value of a different quantity common to a recipe and to a user, for both the recipe and the user. Using classification examples including a user and a recipe, the online concierge system 102 determines a difference between the predicted dietary type 635 output for a classified recipe in a classification example and a label applied to the classified recipe in the classification example. Similarly, the online concierge system 102 determines a difference between the predicted dietary type 635 output for a classified user and a label applied to the classified user by the classification example. Using one or more loss functions, the online concierge system 102 generates an error term based on the determined differences and backpropagates the error term through layers of the weight matrix 630, layers of the user model 605, and layers of the recipe model 610. Using the error term from the output of the weight matrix 630 allows the online concierge system 102 to further refine the user model 605 and the recipe model 610 to better regularize the user embeddings 615 and the recipe embeddings 620 in a common latent space. Such regularization allows the online concierge system 102 to more accurately compare recipes and users using corresponding recipe embeddings 620 and user embeddings 615.

Additionally, the trained machine learning recommendation model 600 includes one or more cross-modal recipe layers 645 coupled to the user model 605 and one or more cross-modal user layers 650 coupled to the recipe model 610. The cross-modal recipe layers 645 receive a user embedding 615 for a user as an input and outputs a predicted recipe embedding 655 corresponding to a recipe with which the user has at least a threshold probability of performing a specific interaction (e.g., including one or more items in an order). In various embodiments, as further described above in conjunction with FIG. 5, when the online concierge system 102 applies the trained machine learning recommendation model 600 to an example of training data including a user and a recipe to which a label was applied indicating the user performed the specific interaction with the recipe, the online concierge system 102 compares a recipe embedding 620 for the recipe of the example to the predicted recipe embedding 655 output by the cross-modal recipe layers 645. Based on the comparison, the online concierge system 102 generates a cross-modal recipe error term, which may be based on a difference between the recipe embedding 620 for the recipe and the predicted recipe embedding 655. The online concierge system 102 backpropagates the cross-modal recipe error term through layers of the recipe model 610 so recipe embeddings 620 output by the recipe model 610 are more similar to the predicted recipe embedding 655, increasing accuracy of the recipe embeddings 620 generated by the recipe model 610.

Similarly, the one or more cross-modal user layers 650 coupled to the recipe model 610 receive a recipe embedding 620 for a user as an input and outputs a predicted user embedding 660 corresponding to a user having at least a threshold probability of performing the specific interaction with the recipe corresponding to the recipe embedding 620. In various embodiments, as further described above in conjunction with FIG. 5, when the online concierge system 102 applies the trained machine learning recommendation model 600 to an example of training data including a user and a recipe to which a label was applied indicating the user performed the specific interaction with the recipe, the online concierge system 102 compares a user embedding 615 for the user of the example to the predicted user embedding 660 output by the cross-modal user layers 650. Based on the comparison, the online concierge system 102 generates a cross-modal user error term, which may be based on a difference between the user embedding 615 for the recipe and the predicted user embedding 660. The online concierge system 102 backpropagates the cross-modal user error term through layers of the user model 605 so user embeddings 615 output by the user model 605 are more similar to the predicted user embedding 660, increasing accuracy of the user embeddings 615 generated by the user model 615.

Referring back to FIG. 5, after training, the parameters of the machine learning recommendation model are stored by the online concierge system 102. Using the trained machine learning recommendation model, the online concierge system 102 generates 525 recipe embeddings for the recipes obtained 505 by the online concierge system by applying the trained machine learning recommendation model to various recipes. The recipe embedding output by the recipe model of the trained machine learning recommendation model when applied to a recipe is stored in association with the recipe in some embodiments. The online concierge system 102 may store a recipe embedding generated 525 for a recipe in association with a recipe identifier or in association with the recipe in various embodiments.

The online concierge system 102 identifies 530 a user and obtains a user embedding for the identified user. For example, the online concierge system 102 identifies 530 users in response to receiving a request to create an order from the user. In another example, the online concierge system 102 identifies 530 users in response to the user accessing the online concierge system 102. As another example, the online concierge system 102 identifies 530 users in response to the user requesting a recommendation for one or more recipes.

The online concierge system 102 obtains a user embedding for the identified user. In some embodiments, the online concierge system 102 generates the user embedding for the identified user in response to identifying 530 the user. To generate the user embedding for the identified user, the online concierge system 102 applies the trained machine learning recommendation model to features of the identified user, as further described above. The user embedding output by the user model of the machine learning recommendation model is the user embedding for the identified user. In some embodiments, the online concierge system 102 retrieves a stored user embedding for the identified user, with the user embedding stored in association with a user identifier of the identified user. For example, the online concierge system 102 stores a user embedding generated for a user from application of the trained machine learning recommendation model.

From the user embedding for the identified user and the recipe embeddings for the obtained recipes, the online concierge system 102 determines 535 a set of candidate recipes. In various embodiments, the online concierge system 102 determines distances between the user embedding for the identified user and recipe embeddings in the latent space and determines 535 the set of candidate recipes as recipes with recipe embeddings within a threshold distance of the user embedding for the identified user in the latent space. The online concierge system 102 may apply one or more approximate nearest neighbor models to the user embedding for the identified user and the recipe embeddings to determine 535 the set of candidate recipes in various embodiments. However, the online concierge system 102 may use other methods to determine 525 the set of candidate recipes based on distances between the user embedding for the user and the recipe embeddings in the latent space in various embodiments.

The online concierge system 102 selects 540 one or more recipes of the set of candidate recipes and displays information describing the selected one or more recipes. In some embodiments, the online concierge system 102 applies the trained machine learning recommendation model to different combinations of the user embedding for the identified user and recipe embeddings for candidate recipes. Based on the measures of similarity between user embedding for the identifier user and recipe embeddings for candidate recipes, the online concierge system 102 selects 540 one or more recipes of the set of candidate recipes. For example, the online concierge system 102 selects 540 candidate recipes with recipe embeddings having at least a threshold measure of similarity to the user embedding for the identified user. As another example, the online concierge system 102 ranks candidate recipes of the set based on measures of similarity (e.g., dot product, cosine similarity) between recipe embeddings for recipes of the set and the user embedding for the identified user and selects 540 recipes having recipe embeddings with at least a threshold position in the set. In other embodiments, the online concierge system 102 applies another model, such as a trained purchase model outputting a predicted probability of the user purchasing one or more items in a recipe, to various combinations of the user embedding for the identified user and recipe embeddings for candidate recipes and selects 540 one or more recipes of the set of candidate recipes based on the output of the other model (e.g., selects 540 recipes having at least a threshold value of the output of the other model or selects 540 recipes having at least a threshold position in a ranking based on the output of the other model).

The online concierge system 102 transmits information describing the one or more selected recipes to a client device 110 of the identified user for display. For example, information describing a selected recipe is displayed in an interface of the customer mobile application 206 executing on the client device 110 of the identified user.

Although described in terms of recommending recipes for a user, the trained machine learning recommendation model may be used to recommend other types of items or content to a user. For example, the recipes in embodiments described herein could be replaced with other types of items or content, such as products for purchase or videos or other media content. Embeddings for those items or content may then be trained as described for recipes, where the user embeddings and embeddings for the items or content are trained in the same latent space as discussed herein. Moreover, the additional training using the classification layers 630 and the cross-modal layers 645, 650 would be useful in such embodiments to help the embeddings all be in the space latent space. The embeddings would then be usable for suggesting items or content to the user, as discussed herein for recipes.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which may be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which includes any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   obtaining, at an online concierge system, a plurality of recipes, wherein each recipe includes items and instructions for combining the included items;
   obtaining, at an online concierge system, training data from prior interactions by users with recipes, the training data including a plurality of examples, each example comprising a user, a recipe, and a label indicating whether the user performed a specific interaction with the recipe;
   initializing a plurality of layers of a machine learning recommendation model, the recommendation model being configured to receive attributes of the recipe and characteristics of the user;
   for each of a plurality of examples of the training data:
   generating a user embedding for a user of an example from application of a user model comprising a first plurality of layers of the recommendation model to characteristics of the user of the example;
   generating a recipe embedding for a recipe of the example from application of a recipe model comprising a second plurality of layers of the recommendation model to attributes of the recipe of the example;
   generating a measure of similarity between the user embedding for the user of the example and the recipe embedding for the recipe of the example the similarity measured in a latent space including the user embedding and the recipe embedding;
   generating an error term based on a difference between the measure of similarity between the user embedding for the user of the example and the recipe embedding for the recipe of the example and a label of the example;
   backpropagating the error term through the user model and through the recipe model to update a set of parameters of the recommendation model; and
   stopping the backpropagation after one or more criteria are satisfied;
   obtaining a plurality of classification examples, each classification example including a classified user, a classified recipe, a classification label indicating a dietary preference type of the classified user, and a classification label indicating a dietary preference type of the classified recipe; and
   for each of the plurality of classification examples:
   generating a user embedding for a classified user of a classification example from application of the user model to characteristics of the classified user of the classification example;
   generating a recipe embedding for a classified recipe of the classification example from application of the recipe model to attributes of the classified recipe of the classification example;
   generating a predicted dietary type for the classified user and a predicted dietary type for the classified recipe output by a set of classification layers receiving the user embedding for the classified user of the classification example and the recipe embedding for the classified recipe of the classification example;
   generating a classification error term based on a difference between the predicted dietary type for the classified user and the classification label indicating the dietary preference type of the classified user or based on a difference between the predicted dietary type for the classified recipe and the classification label indicating the dietary preference type of the classified recipe;
   backpropagating the classification error term through the user model and through the recipe model to update the set of parameters of the recommendation model, resulting in an updated set of parameters of the recommendation model; and
   stopping the backpropagation of the classification error term after one or more criteria are satisfied.

2. The method of claim 1, further comprising:
   for each of a set of examples of the training data having a label indicating that the user of the example performed the specific interaction with the recipe of the example:
   generating a user embedding for a user of an example of the set from application of the user model to characteristics of the user of the example of the set;
   generating a recipe embedding for a recipe of the example of the set from application of the recipe model to attributes of the recipe of the example;
   generating a predicted recipe embedding from one or more cross-modal recipe layers configured to receive the user embedding for the user of the example of the set as input, wherein the predicted recipe embedding corresponds to a predicted recipe with which the user of the example of the set has at least a threshold probability of performing the specific interaction;
   generating a cross-modal recipe error term based on one or more differences between the predicted recipe embedding and the recipe embedding for the recipe of the example of the set;

backpropagating the cross-modal recipe error term through the recommendation model to update the set of parameters of the recommendation model; and stopping the backpropagation of the cross-modal recipe error term after one or more criteria are satisfied.

3. The method of claim 2, further comprising:

for each of the set of examples of the training data:

generating a predicted user embedding from one or more cross-modal user layers configured to receive the recipe embedding for the recipe of the example of the set as input, wherein the predicted user embedding corresponds to a predicted user having at least the threshold probability of performing the specific interaction with the recipe of the example of the set;

generating a cross-modal user error term based on one or more differences between the predicted user embedding and the user embedding for the user of the example of the set:

backpropagating the cross-modal user error term through the user model to update the set of parameters of the recommendation model; and stopping the backpropagation of the cross-modal user error term after one or more criteria are satisfied.

4. The method of claim 1, further comprising:

applying the trained recommendation model to attributes of the obtained recipes: and storing recipe embeddings corresponding to the obtained recipes generated by the recipe model of the trained recommendation model in association with corresponding obtained recipes.

5. The method of claim 4, further comprising:

identifying a user of the online concierge system;

generating a user embedding for the identified user from application of the trained recommendation model to characteristics of the identified user;

determining a set of candidate recipes based on distances between the user embedding for the identified user and recipe embeddings for the obtained recipes;

selecting one or more recipes of the set of candidate recipes: and transmitting information describing the selected one or more recipes to a client device of the identified user for display.

6. The method of claim 5, wherein determining the set of candidate recipes based on distances between the user embedding for the identified user and recipe embeddings for the obtained recipes comprises:

selecting candidate recipes having recipe embeddings within a threshold distance of the user embedding for the identified user as the set of candidate recipes.

7. The method of claim 1, wherein one or more attributes of the recipe of the example comprise an item embedding corresponding to each item in the recipe of the example.

8. The method of claim 7, wherein an attribute of the recipe comprises a fixed-length combined item embedding representing a combination of items included in the recipe of the example generated by application of a regularization model to a combination of the item embeddings corresponding to the items in the recipe of the example.

9. The method of claim 1, wherein an attribute of the recipe of the example comprises one or more attributes selected from a group consisting of: a term embedding of a name of an item included in the recipe of the example, a document embedding generated from instructions in the recipe of the example for combining items included in the recipe, an image embedding of an image included in the recipe, and any combination thereof.

10. The method of claim 1, wherein an attribute of the recipe identifies one or more salient items of the recipe, a salient item of the recipe identified based on a quantity of the item specified by the recipe relative to quantities of the item specified by other recipes.

11. A computer program product comprising a non-transitory computer readable storage medium having instructions encoded thereon that, when executed by a processor, cause the processor to:

obtain, at an online concierge system, a plurality of recipes, wherein each recipe includes items and instructions for combining the included items;

obtain, at an online concierge system, training data from prior interactions by users with recipes, the training data including a plurality of examples, each example comprising a user, a recipe, and a label indicating whether the user performed a specific interaction with the recipe;

initialize a plurality of layers of a machine learning recommendation model, the recommendation model being configured to receive attributes of the recipe and characteristics of the user;

for each of a plurality of examples of the training data:

generate a user embedding for a user of an example from application of a user model comprising a first plurality of layers of the recommendation model to characteristics of the user of the example;

generate a recipe embedding for a recipe of the example from application of a recipe model comprising a second plurality of layers of the recommendation model to attributes of the recipe of the example;

generate a measure of similarity between the user embedding for the user of the example and the recipe embedding for the recipe of the example, the similarity measured in a latent space including the user embedding and the recipe embedding;

generate an error term based on a difference between the measure of similarity between the user embedding for the user of the example and the recipe embedding for the recipe of the example and a label of the example;

backpropagate the error term through the user model and through the recipe model to update a set of parameters of the recommendation model; and stop the backpropagation after one or more criteria are satisfied;

obtain a plurality of classification examples, each classification example including a classified user, a classified recipe, a classification label indicating a dietary preference type of the classified user, and a classification label indicating a dietary preference type of the classified recipe; and for each of the plurality of classification examples:

generate a user embedding for a classified user of a classification example from application of the user model to characteristics of the classified user of the classification example;

generate a recipe embedding for a classified recipe of the classification example from application of the recipe model to attributes of the classified recipe of the classification example;

generate a predicted dietary type for the classified user and a predicted dietary type for the classified recipe output by a set of classification layers receiving the user embedding for the classified user of the classification example and the recipe embedding for the classified recipe of the classification example;
generate a classification error term based on a difference between the predicted dietary type for the classified user and the classification label indicating the dietary preference type of the classified user or based on a difference between the predicted dietary type for the classified recipe and the classification label indicating the dietary preference type of the classified recipe;
backpropagate the classification error term through the user model and through the recipe model to update the set of parameters of the recommendation model, resulting in an updated set of parameters of the recommendation model; and
stop the backpropagation of the classification error term after one or more criteria are satisfied.

12. The computer program product of claim 11, wherein the non-transitory computer readable storage medium further has instructions encoded thereon that, when executed by the processor, cause the processor to:
for each of a set of examples of the training data having a label indicating that the user of the example performed the specific interaction with the recipe of the example:
generate a user embedding for a user of an example of the set from application of the user model to characteristics of the user of the example of the set;
generate a recipe embedding for a recipe of the example of the set from application of the recipe model to attributes of the recipe of the example;
generate a predicted recipe embedding from one or more cross-modal recipe layers configured to receive the user embedding for the user of the example of the set as input, wherein the predicted recipe embedding corresponds to a predicted recipe with which the user of the example of the set has at least a threshold probability of performing the specific interaction;
generate a cross-modal recipe error term based on one or more differences between the predicted recipe embedding and the recipe embedding for the recipe of the example of the set;
backpropagate the cross-modal recipe error term through the recipe model to update the set of parameters of the recommendation model; and
stop the backpropagation of the cross-modal recipe error term after one or more criteria are satisfied.

13. The computer program product of claim 12, wherein the non-transitory computer readable storage medium further has instructions encoded thereon that, when executed by the processor, cause the processor to:
for each of the set of examples of the training data:
generate a predicted user embedding from one or more cross-modal user layers configured to receive the recipe embedding for the recipe of the example of the set as input, wherein the predicted user embedding corresponds to a predicted user having at least the threshold probability of performing the specific interaction with the recipe of the example of the set,
generate a cross-modal user error term based on one or more differences between the predicted user embedding and the user embedding for the user of the example of the set,
backpropagate the cross-modal user error term through the user model to update the set of parameters of the recommendation model; and
stopping the backpropagation of the cross-modal user error term after one or more criteria are satisfied.

14. The computer program product of claim 11, wherein the non-transitory computer readable storage medium further has instructions encoded thereon that, when executed by the processor, cause the processor to:
apply the trained recommendation model to attributes of the obtained recipes; and
store recipe embeddings corresponding to the obtained recipes generated by the recipe model of the trained recommendation model in association with corresponding obtained recipes.

15. The computer program product of claim 14, wherein the non-transitory computer readable storage medium further has instructions encoded thereon that, when executed by the processor, cause the processor to:
identify a user of the online concierge system;
generate a user embedding for the identified user from application of the trained recommendation model to characteristics of the identified user;
determine a set of candidate recipes based on distances between the user embedding for the identified user and recipe embeddings for the obtained recipes;
select one or more recipes of the set of candidate recipes; and
transmit information describing the selected one or more recipes to a client device of the identified user for display.

16. The computer program product of claim 15, wherein determining the set of candidate recipes based on distances between the user embedding for the identified user and recipe embeddings for the obtained recipes comprises:
selecting candidate recipes having recipe embeddings within a threshold distance of the user embedding for the identified user as the set of candidate recipes.

17. The computer program product of claim 11, wherein one or more attributes of the recipe of the example comprise an item embedding corresponding to each item in the recipe of the example.

18. The computer program product of claim 17, wherein an attribute of the recipe comprises a fixed-length combined item embedding representing a combination of items included in the recipe of the example generated by application of a regularization model to a combination of the item embeddings corresponding to the items in the recipe of the example.

19. The computer program product of claim 11, wherein an attribute of the recipe of the example comprises one or more attributes selected from a group consisting of: a term embedding of a name of an item included in the recipe of the example, a document embedding generated from instructions in the recipe of the example for combining items included in the recipe, an image embedding of an image included in the recipe, and any combination thereof.

20. A system comprising:
a processor;
a non-transitory computer-readable storage medium having instructions encoded thereon that, when executed by the processor, cause the processor to:
obtain, at an online concierge system, a plurality of recipes, wherein each recipe includes items and instructions for combining the included items;
obtain, at an online concierge system, training data from prior interactions by users with recipes, the training data including a plurality of examples, each example comprising a user, a recipe, and a label indicating whether the user performed a specific interaction with the recipe;

initialize a plurality of layers of a machine learning recommendation model, the recommendation model being configured to receive attributes of the recipe and characteristics of the user;

for each of a plurality of examples of the training data:
- generate a user embedding for a user of an example from application of a user model comprising a first plurality of layers of the recommendation model to characteristics of the user of the example;
- generate a recipe embedding for a recipe of the example from application of a recipe model comprising a second plurality of layers of the recommendation model to attributes of the recipe of the example;
- generate a measure of similarity between the user embedding for the user of the example and the recipe embedding for the recipe of the example, the similarity measured in a latent space including the user embedding and the recipe embedding;
- generate an error term based on a difference between the measure of similarity between the user embedding for the user of the example and the recipe embedding for the recipe of the example and a label of the example;
- backpropagate the error term through the user model and through the recipe model to update a set of parameters of the recommendation model; and
- stop the backpropagation after one or more criteria are satisfied; and obtain a plurality of classification examples, each classification example including a classified user, a classified recipe, a classification label indicating a dietary preference type of the classified user, and a classification label indicating a dietary preference type of the classified recipe; and for each of the plurality of classification examples:
- generate a user embedding for a classified user of a classification example from application of the user model to characteristics of the classified user of the classification example;
- generate a recipe embedding for a classified recipe of the classification example from application of the recipe model to attributes of the classified recipe of the classification example;
- generate a predicted dietary type for the classified user and a predicted dietary type for the classified recipe output by a set of classification layers receiving the user embedding for the classified user of the classification example and the recipe embedding for the classified recipe of the classification example;
- generate a classification error term based on a difference between the predicted dietary type for the classified user and the classification label indicating the dietary preference type of the classified user or based on a difference between the predicted dietary type for the classified recipe and the classification label indicating the dietary preference type of the classified recipe;
- backpropagate the classification error term through the user model and through the recipe model to update the set of parameters of the recommendation model, resulting in an updated set of parameters of the recommendation model; and
- stop the backpropagation of the classification error term after one or more criteria are satisfied.

* * * * *